US011057170B2

(12) United States Patent
Hammond et al.

(10) Patent No.: US 11,057,170 B2
(45) Date of Patent: Jul. 6, 2021

(54) MULTIDIMENSIONAL SHARED SPECTRUM ACCESS

(71) Applicant: Raytheon Company, Waltham, MA (US)

(72) Inventors: Mark B. Hammond, Waltham, MA (US); Michael Rakijas, Waltham, MA (US); Marina Gurevich, Waltham, MA (US)

(73) Assignee: Raytheon Company, Waltham, MA (US)

( * ) Notice: Subject to any disclaimer, the term of this patent is extended or adjusted under 35 U.S.C. 154(b) by 56 days.

(21) Appl. No.: 16/047,765

(22) Filed: Jul. 27, 2018

(65) Prior Publication Data
US 2020/0036487 A1    Jan. 30, 2020

(51) Int. Cl.
*H04L 5/00* (2006.01)
*H04W 16/14* (2009.01)
(Continued)

(52) U.S. Cl.
CPC ............ *H04L 5/0012* (2013.01); *G01S 7/003* (2013.01); *G01S 7/023* (2013.01); *G01S 13/86* (2013.01); *G01S 13/937* (2020.01); *H04L 5/003* (2013.01); *H04W 16/14* (2013.01); *H04W 74/0816* (2013.01); *H04W 84/005* (2013.01); *H04W 84/18* (2013.01); *G01S 13/931* (2013.01); *G01S 2013/9316* (2020.01); *H04L 27/0006* (2013.01)

(58) Field of Classification Search
CPC .... H04L 5/0012; H04W 16/14; H04W 84/18; H04W 84/005; H04W 74/0816
See application file for complete search history.

(56) References Cited

U.S. PATENT DOCUMENTS 6,757,265 B1 * 6/2004 Sebastian ............. H04B 7/0613
370/319
9,220,123 B1 * 12/2015 Dunne ................... H04W 76/14
(Continued)

FOREIGN PATENT DOCUMENTS

GB      2429879 A    3/2007
WO   2014/110161    7/2014

OTHER PUBLICATIONS

International Search Report and Written Opinion from related PCT Application No. PCT/US2019/025291 dated Jul. 5, 2019.
(Continued)

*Primary Examiner* — Ajit Patel
*Assistant Examiner* — Wilfred Thomas
(74) *Attorney, Agent, or Firm* — Burns & Levinson, LLP; Joseph M. Maraia

(57) ABSTRACT

Systems and methods are provided herein for implementing a hybrid communications network including both radar and radio communications devices. These systems and methods may advantageously include shared resource allocation protocols for automatically allocating communication resources for transmitting and/or receiving a signal using a device in the network based on one or more dimensions of separability for the signal selected from time-division, frequency-division, spatial-division and/or code-division multiplexing. Importantly, the resource allocation protocol may account for radar specific operational parameters of one or more radar devices in the network.

20 Claims, 12 Drawing Sheets

(51) Int. Cl.

| | |
|---|---|
| *H04W 74/08* | (2009.01) |
| *H04W 84/00* | (2009.01) |
| *H04W 84/18* | (2009.01) |
| *G01S 13/931* | (2020.01) |
| *G01S 13/937* | (2020.01) |
| *G01S 13/86* | (2006.01) |
| *G01S 7/00* | (2006.01) |
| *G01S 7/02* | (2006.01) |
| *H04L 27/00* | (2006.01) |

(56) References Cited

U.S. PATENT DOCUMENTS

| | | | |
|---|---|---|---|
| 9,516,508 B2 | 12/2016 | Amanna et al. | |
| 9,900,172 B2* | 2/2018 | Goel | H04W 4/70 |
| 2006/0062249 A1* | 3/2006 | Hall | E21B 47/12 |
| | | | 370/468 |
| 2007/0042784 A1* | 2/2007 | Anderson | H04B 17/24 |
| | | | 455/450 |
| 2007/0053319 A1* | 3/2007 | Hulbert | G01S 7/023 |
| | | | 370/329 |
| 2007/0116228 A1* | 5/2007 | Schneider | H04M 3/38 |
| | | | 379/211.01 |
| 2009/0052429 A1* | 2/2009 | Pratt, Jr. | G01D 21/00 |
| | | | 370/350 |
| 2009/0252134 A1* | 10/2009 | Schlicht | H04W 40/08 |
| | | | 370/338 |
| 2010/0135241 A1* | 6/2010 | Wang | H04W 16/14 |
| | | | 370/329 |
| 2011/0002274 A1* | 1/2011 | Grandblaise | H04W 16/14 |
| | | | 370/329 |
| 2011/0170515 A1* | 7/2011 | Kim | H04W 4/70 |
| | | | 370/330 |
| 2013/0303114 A1* | 11/2013 | Ahmad | H04M 15/49 |
| | | | 455/406 |
| 2015/0110011 A1* | 4/2015 | Wei | H04W 74/006 |
| | | | 370/329 |
| 2015/0124650 A1* | 5/2015 | Misra | H04W 74/00 |
| | | | 370/254 |
| 2017/0208474 A1* | 7/2017 | Mody | H04W 16/14 |
| 2019/0059000 A1* | 2/2019 | Sun | H04W 16/14 |

OTHER PUBLICATIONS

Lackpour et al., "Design and analysis of an information exchange-based radar/communications spectrum sharing system (RCS3)", 2016 IEEE, May 2, 2016, pp. 1-6, XP032908847.

Lee et al., "Shared apperture modem (SAM) with directional antenna for unmanned airborne networking" 2006 International Waveform Diversity & Design Conference, IEEE, Jan. 22, 2006, pp. 1-8, XP033332207.

* cited by examiner

Dimensionality of Operation

| Dimension | Radar |
|---|---|
| Time | Adjustable Timeline Based Interrogated Range 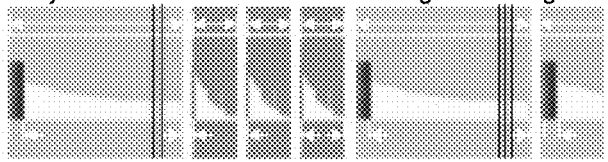 |
| Frequency | Radar with Frequency Diversity Capability<br>Individual Channels<br>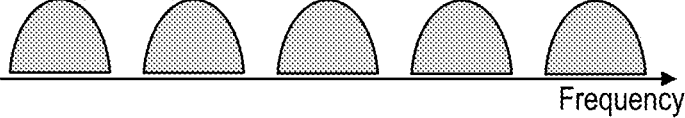<br>Frequency |
| Space | 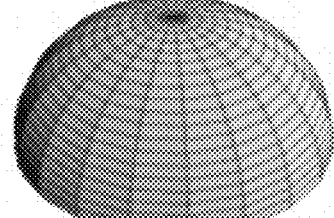<br>Beampattern Partitioning |
| Coding | Example Pseudorandom Binary Codes for Radar<br>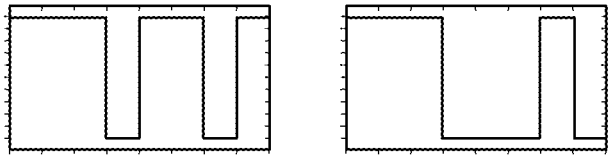 |
| Cardinality | 2) For a given deployment or scenario, the devices that are going to participate are programmed for the dimensionality and resources (time, frequency, spatial coding) that are available and how they are to be partitioned, subdivided, timed and allocated on a unit-by-unit basis. |

Figure 1

Static Example Sequence Result

| Time\Element | 1 | 2 | 3 | 4 | 5 | 6 | 7 | 1 | 2 | 3 | 4 | 5 | R1 | R2 | R3 |
|---|---|---|---|---|---|---|---|---|---|---|---|---|---|---|---|
| $t_1$ | Sup | Win | Sup | Sup | Sup | Sup | Win | Sup | Win | Sup | Sup | Win | | | |
| $t_2$ | Sup | Sup | Win | Sup | Sup | | | Win | Sup | | | | Win | | |
| $t_3$ | | | | Sup | | Win | | | | | | | Win | | |
| $t_4$ | Win | Sup | Sup | Win | Sup | Sup | Win | | Sup | Win | Sup | | Win | Win | |
| $t_5$ | Sup | Sup | Sup | Sup | Sup | | Sup | Sup | Sup | Win | Sup | | Win | Win | |
| $t_6$ | Sup | Sup | Sup | Win | Win | | Sup | | Sup | | Sup | | | Win | |
| $t_7$ | | | | | Win | | | | | | Sup | Win | | Win | |

Figure 6

Dynamic Example Sequence Result

| Time/Element | 1 | 2 | 3 | 4 | 5 | 6 | 7 | 1 | 2 | 3 | 4 | 5 | R1 | R2 | R3 |
|---|---|---|---|---|---|---|---|---|---|---|---|---|---|---|---|
| $t_1$ | Sup | Win | Sup | | Sup | Sup | Win | Sup | Win | Sup | Sup | Win | | | |
| $t_2$ | Sup | Sup | Win | Sup | Sup | Win | | Win | Sup | | Sup | | | | |
| $t_3$ | | | | Sup | Sup | Sup | | | Sup | Win | Sup | | Win | | |
| $t_4$ | Win | Sup | | Win | Sup | Win | Win | Sup | Sup | Win | Sup | | Win | | |
| $t_5$ | Sup | Sup | Sup | Sup | Sup | | Sup | Sup | Sup | Win | Sup | | | Win | |
| $t_6$ | Sup | Sup | Sup | Win | Win | | Sup | Sup | Sup | Win | Sup | Win | Win | Win | |
| $t_7$ | | Sup | Sup | | Win | | | | | | Sup | Win | | Win | |

Figure 8

MULTIDIMENSIONAL SHARED SPECTRUM ACCESS

BACKGROUND

Current RF spectrum allocation, particularly by the military, is increasingly limited, encroached upon and may continue to shrink, e.g., due to increased civil demand. Thus, there is a need for communications systems and methods that more efficiently utilize allocate spectrum. In particular, it would be advantageous to enable object detections systems such as radar, and radio communications devices to coexist in the same bands at the same time.

U.S. application Ser. No. 13/835,012 describes heterogeneous spectrum sharing utilizing a request/allocation and environmental map. PCT Application No. PCT/US2014/010722 describes allocation of spectrum access based frequency division or time division multiplexing. This would include the systems and methods that may detect unused spectrum bandwidth by a primary holder and allocate such to secondary users.

In general, existing technologies exclude simultaneous use (do not utilize the same spectrum in the same space at the same time by multiple simultaneous users. Moreover, existing technologies do not relate to sharing radio spectrum access between communications and object detection signals. Also, existing technologies tend to be reactive to pre-existing transmissions rather than proactively managing transmission characteristics of resources to better cooperate with one another for simultaneous use. Such reactive allocation often requires active monitoring of existing transmissions which can complicate the process. These and other deficiencies are addressed by the present disclosure.

SUMMARY

Systems and methods are provided herein for implementing a hybrid communications network including both radar and radio communications devices. These systems and methods may advantageously include shared resource allocation protocols for automatically allocating communication resources for transmitting and/or receiving a signal using a device in the network based on one or more dimensions of separability for the signal selected from time-division, frequency-division, spatial-division and/or code-division multiplexing. These systems and methods may advantageously include shared resource allocation protocols for automatically allocating communication resources for transmitting and/or receiving a signal using a device in the network based on one or more dimensions of separability for the signal selected from time-division, frequency-division, spatial-division and/or code-division multiplexing. Importantly, the resource allocation protocol may account for radar specific operational parameters of one or more radar devices in the network. Advantageously, in some embodiments, the resource allocation protocols are predetermined prior to deployment of the communications network. In other embodiments, the resource allocation protocols may adapt to deployment conditions such as one or more pre-existing or legacy based devices. In example embodiments, the hybrid communications network may reflect mission specific deployment requirements for a military operation. In addition to military uses, there are several commercial applications, especially in 5G enabled environments such as IoT devices, vehicle to vehicle communications, co-located radar, nano and femto cell networks, and medical wireless devices.

In some embodiments, a shared join protocol may be included for new devices joining the network whereby a new device is synchronized to the resource allocation protocols. Thus, a joining device in the network may share information including, e.g., identity/role (radar or radio node, etc.); resource utilization (band occupancy, slot count needs, range of influence, etc.) and position and trajectory information, which may be used to optimize resource allocation across the network. Advantageously, in preferred embodiments, the communications network is a decentralized network without fixed infrastructure, such as a mobile ad hoc network (MANET).

In example embodiments, the resource allocation protocols may be shared across a plurality of devices in the network including at least one radar based device and at least one radio communications device. In some embodiments, the resource allocation protocols may implement a shared medium access control (MAC) that jointly manages access for both radar and radio communications devices. The resource allocation protocols may also include a shared resource allocation manager (RAM) implementing resource allocation algorithms based on a pseudorandom hashing algorithms that awards communication resources to the devices in the network based on preprogrammed allocation parameters and a current world view of devices in the network. Each of the radar and radio communications devices in the network may advantageously be characterized in an OSI model, the OSI model implementing the shared MAC and RAM. Notably, a current world view may dynamically updated based on geographic movement between devices in the network.

In some embodiments, a radar device provides constraints as a dominant or master signal around which resources for radio communications devices are allocated. Thus, e.g., one or more radar devices may be provided with a predetermined fixed resource allocation while one or more radio communications devices may be dynamically allocated with the remaining resources. For example, in some embodiments, time resources may be allocated based on statistical time-division multiplexing (STDM) or based on a combination of synchronous time-division multiplexing (TDM) and statistical time-division multiplexing (STDM). STDM may be particularly advantageous for non-real time data communications with lower priorities.

In some embodiments, the resource allocation protocols include algorithms for dividing up available bandwidth into a series of non-overlapping frequency sub-bands. Individual radar channels may advantageously be limited to a particular predetermined sub-band. In example embodiments, each sub-band may be further divided by orthogonality (particularly, with respect to radio communications allocation). One example of frequency-division resource allocation includes orthogonal frequency-division multiplexing (OFDM). In some embodiments, adaptive transmission may be applied based on an analysis of power allocation across all sub-bands or within a given sub-band, the adaptive transmission allocating stronger signal sub-bands to priority signals.

In some embodiments, the resource allocation protocols may further consider cardinality of devices in the communications network. Thus, for example, the resource allocations protocols may be configured to allocate communications resources to the device based on a cardinality of the device as relating to a geographic location of the device in relations to a related group of devices across the network. A multi-node network model may advantageously be utilized to actively monitor potential conflicts between devices across the communications network and reassign resources if a conflict/overlap is detected. Thus, in some embodiments, the resource allocation protocols may be configured to establishing a geographic based cardinality for the device including identifying a plurality of other devices which are in close enough proximity geographically or have the signal strength to potentially conflict with the device signal.

In further embodiments, the spectrum of operation may be in the millimeter wavelength area, and because this is the proposed frequency band for the future commercial "5G" capable devices, the number of users active simultaneously may be expected to be much greater, inherently increasing the complexity of apportioning RF resources. At these higher frequencies, potential interference from other co-located 5G devices is greater than at lower frequencies; utilization of other resources in other dimensions allows for optimization of resources to support simultaneous RF coexistence of RF participants.

BRIEF DESCRIPTION OF DRAWINGS

The present disclosure is further described in the detailed description which follows, in reference to the noted plurality of drawings by way of non-limiting examples of embodiments of the present disclosure.

FIG. 6 depicts a table illustrating the exemplary allocation sequence for the static example of FIG. 5, according to the present disclosure.

FIG. 8 illustrates possible geometric conflict with respect to the resource allocation of FIG. 6 given the dynamic world view of FIG. 7, according to the present disclosure.

DETAILED DESCRIPTION

Figure 1:
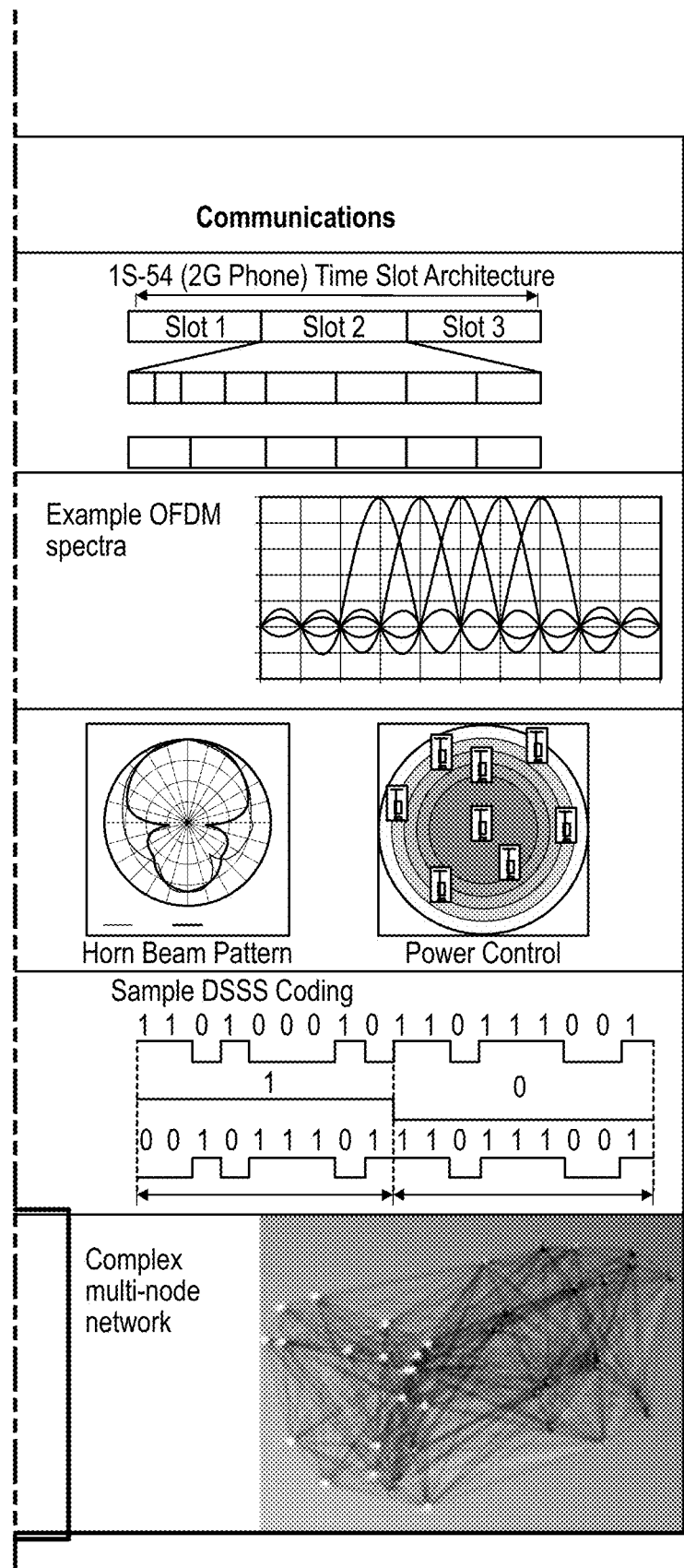
FIG. 1 depicts exemplary dimensionalities of operation for allocating resources across a communications network, according to the present disclosure.
Figure 1:
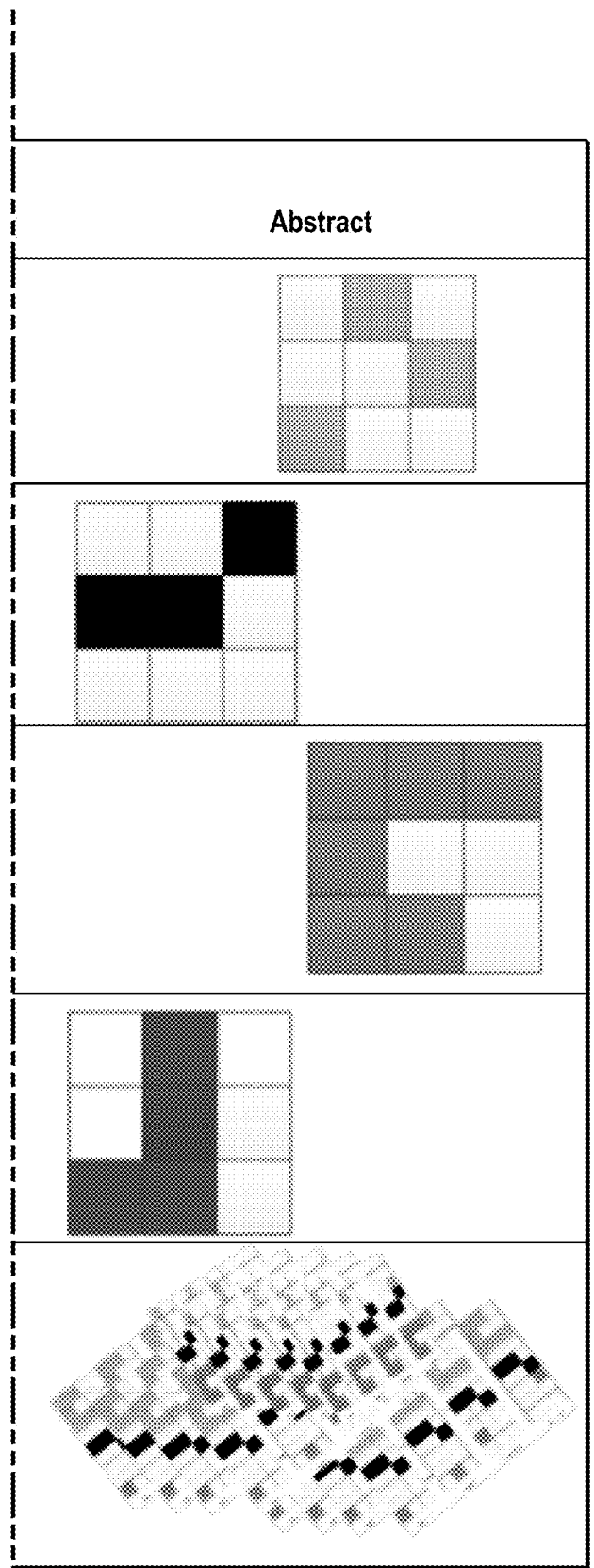

The systems and methods of the present disclosure, utilize novel resource allocation protocols to proactively allocate communication resources between a plurality of object-detection systems (e.g., radar/radio systems) and radio devices over a communications network. More particularly, the systems and methods of the present disclosure, allocate communication resources (over a common spectrum) based on a plurality of dimensions of separability between signals including, e.g., time slot allocation (time-division), frequency sub-band division (frequency-division), non-overlap of directional antenna patterns (spatial-division), orthogonality of coding (code-division) and cardinality (group-division). In general, the array of users cooperate in sharing the available spectrum by carrying out the same resource management algorithms to allocate the resources among them to prevent collision and conflict. Advantageously, in some embodiments, a resource allocation protocol may utilize "net join" type principles where a new user is synchronized to the resource allocation protocol through joining the network.

In some embodiments, the communications network may be a mobile ad hoc network (MANET) or other decentralized type of communications network. A MANET is a continuously self-configuring, infrastructure-less network of mobile devices connected wirelessly. One advantage to a decentralized network is that they are typically more robust than centralized networks due to the multi-hop fashion in which information is relayed (the chance of a single point of failure in a MANET is reduced significantly since the data can take multiple paths through the network). Since the MANET architecture evolves with time, it has the potential to resolve issues such as isolation/disconnection from the network. Further advantages of MANET type communications networks over networks with a fixed topology include flexibility (an ad hoc network can be created anywhere with mobile devices), scalability (one can easily add more nodes to the network) and lower administration costs (no need to build an infrastructure first). MANET type communications networks are particularly advantageous for military applications due to flexibility and scalability. MANET type communications networks can be easily adapted to mission specific deployment requirements with an emphasis on fast re-routing during mobility.

The communications systems may advantageously utilize an efficient and distributed medium access control (MAC) protocol to provide for flow control and multiplexing over the transmission medium. Channel access control mechanisms provided by the MAC layer are also known as a multiple access protocol. This makes it possible for several connected devices connected to share a common transmission medium. The multiple access protocol may detect or avoid data packet collisions if a packet mode contention based channel access method is used, or reserve resources to establish a logical channel if a circuit-switched or channelization-based channel access method is used. The channel access control mechanism may rely on a physical layer multiplex scheme.

In some embodiments, each device connected to the communications network may include a common media access control (MAC) for both object-detection and communications (RC-MAC) that manages access to the media for each device. This corresponds to unit-by-unit allocation which as described herein may be pre-programmed/designed. Each device may also include a resource allocation manager (RAM) which is also common across devices. The RAM may implement resource allocation algorithms to provide common outcomes across all devices so that resource allocations will be known to and among all devices. In example embodiments, the RAM may be based on pseudorandom hashing algorithms that award resources to each of the devices ("winners") participating in the network. They may be members of many classes of algorithm so long as they all come up with the same winner set among the available dimensions to share among the devices. The way the winners are awarded the resources correspond to the way they were pre-programmed as to the partitioning dimensions (e.g., whether by subdivision in time, frequency, coding or other dimension on a unit-by-unit basis).

In example embodiments, object detection systems and communications devices may be characterized and standardized across the communications network via a conceptual model such as the Open Systems Interconnection model (OSI model). This advantageously enables common implementation across disparate hosts providing for interoperability of diverse communication systems with standard protocols. Thus, e.g., in some embodiments, both object-detection systems and radio communications devices may be commonly characterized using the OSI model. The OSI model advantageously partitions a communication system into a hierarchy of abstraction layers (where higher level abstraction layer are served by lower level abstraction layer). In general, lower level abstraction layers (media layers) are primarily focused on moving data around while higher level abstraction layers (host layers) contain application-level data. In implementing communications, each level layer takes care of a very specific job, and then passes the data onto the next level layer. Protocols at each level enable an entity in one host to interact with a corresponding entity at the same level layer in another host. Service definitions abstractly describe the functionality provided to an (N)-layer by an (N−1) layer, where N was one of the layers of protocols operating in the local host. At each level N, two entities at the communicating devices (layer N peers) exchange protocol data units (PDUs) by means of a layer N protocol. Each PDU contains a payload, called the service data unit (SDU), along with protocol-related headers or footers. Thus, data processing by two communicating OSI-compatible devices is done as such: Data to be transmitted is composed at the topmost layer of the transmitting device (layer N) into a protocol data unit (PDU). The PDU is passed to layer N−1, where it is known as the service data unit (SDU). At layer N−1 the SDU is concatenated with a header, a footer, or both, producing a layer N−1 PDU. It is then passed to layer N−2. The process continues until reaching the lowermost level, from which the data is transmitted to the receiving device. At the receiving device the data is passed from the lowest to the highest layer as a series of SDUs while being successively stripped from each layer's header or footer, until reaching the topmost layer, where the last of the data is consumed. OSI standards documents are available from the ITU-T while some of the protocol specifications are also available as part of the ITU-T X series. Equivalent ISO and ISO/IEC standards for the OSI model are available from ISO.

An early use case limited hybrid radar/radio communications MAC (RC-MAC) implemented via a common stack model and based on the multipurpose adaptive parameters is the Radar Common Data Link (R-CDL). The common stack model approach was applied to implementation of a threshold capability, i.e. CDL two-way communication through an airborne radar aperture to/from an IP-enabled R-CDL ground station (Cardinality=2). Threshold capability was constructed using a limited-dimension RC-MAC which leveraged:

time dimension: aperture "job" manager scheduling interleaved radar and communications "jobs"
  time/space dimension: repurposed a "conventional" radar time line (transmit then receive) to achieve half-duplex communications
  frequency dimension: mapped the instantaneous bandwidth to the radar system REX for a radar or comm transmission A subsequent implementation of R-CDL objective capability modified the RC-MAC in two ways and leveraged:
  cardinality dimension: N=3 radar/comm nodes
  full stack implementation: MANET protocol stack (OSI Layer 3 and above) for store-and-forward, etc. for a fully mobile network with no fixed infrastructure Advantageously, the systems and methods of the present disclosure provide for communications networks for synchronizing radar/radio and radio signals via one or more of (and preferably all of) the following waveform dimensionalities: frequency division, coding, e.g., digital signal coding; and spatial multiplexing (e.g., orthogonality). In addition time and signal cardinality may be used as additional waveform dimensionalities for multiplexing signals. These waveform dimensionalities may be used to enable multiple object-detection system so that they can coexist within an operational area and not conflict with each other or with the cooperative radio users. Thus, the systems and methods make greater use of limited spectrum/time resources among the users as compared with static allocation schemes (it is amenable to adaptive resource allocation as well).

While embodiments described herein may be described with respect to hybrid communications systems including radar systems, it is appreciated that the systems and methods described may similarly be applicable with respect to other object-detection systems such as RADAR, LIDAR, etc. In particular, the systems and methods described herein advantageously enable object-detection systems (such as RADAR) and communications devices to operate within a common medium (e.g., radio waves) based on one or more dimensions of separability between signals.

In order to allocate resources within a common medium to users of that medium, different algorithmic methods may be utilized to apportion the common medium into multiple logical channels that are separated by different dimensionalities mentioned previously. A class of algorithmic methods also utilized in other types of distributed systems includes hash tables, consistent hashing and distributed hash table (DHT). Typically these algorithms are used to support many different Web services such as distributed storage, server load balancing, and many other peer to peer systems. The key feature of the different hash related algorithms is the ability to apportion resources to a multiplicity of users in a fair or proportional manner over an elapsed time period. A basic hash table could be used to apportion one dimension (time) and translate between the set of users wishing to use that medium, and the specific unit of time allocation determined to be used by each participant. A more complex distributed hash table could be used for multiple dimensions simultaneously and apportion the use of those dimensions to the specific set of users who may have a disparate set of resource needs at each of the distributed locations.

FIG. 1 depicts exemplary dimensionalities of operation for allocating resources across a communications network.

Time-division multiplexing (TDM) is one technique which may be applied. In the time dimensionality a radar signal may include an adjustable timeline based interrogated range. Notably a radar signal may often be stringent in its time allocation or constraints and may therefore serve as a master or dominant signal (with priority). Thus, in example embodiments the systems and methods of the present disclosure may be configured to determine a time signature for a priority radar signal and assign allocation of time resources to other users (e.g., to radios) based thereon, e.g., so as to intersperse the radio signals into empty (nul) blocks for the radar. A IS-54 (2G Phone) or other type of time slot architecture may then be used in dividing the available time resources between the different radio users. Notably, timing synchronization is an important factor to consider in implementing time based multiplexing. In some embodiments the communications network may be a synchronous communications network, e.g., utilizing a primary reference clock. In particular, a master clock may be used to provide for time synchronized communications. Alternatively, the communications network may be asynchronous (data is not transmitted at regular intervals). Thus, e.g., in some embodiments, the communications system may be configured to actively monitor and synchronize time based communications and/or allocate time resources as needed (i.e., in some embodiments time slot allocation is flexible rather than fixed).

Synchronous TDM is a method of transmitting and receiving independent signals over a common signal path by means of synchronized communication switching so that each signal appears over the signal path only a fraction of time often implemented in a fixed alternating pattern. Statistical time-division multiplexing (STDM) (also known as asynchronous or dynamic time-division multiplexing) is an advanced version of TDM in which both the address of the terminal and the data itself are transmitted together for better routing. Using STDM allows time slots to be dynamically allocated based on need. Thus, STDM does not pre-allocate time slots to specific devices, but rather assigns a time slot only when required (e.g., for transmitting or receiving data). Like synchronous TDM, STDM allows a plurality of signals to be multiplexed over a common single path. Unlike synchronous TDM, however, in STDM the maximum the number of time slots needed if all devices are operating simultaneously can be greater than the actual capacity of the signal path. To illustrate, in a synchronous TDM implementation, N devices may be configured to correspond with n time slots available along the signal path while in an asynchronous system N devices may instead utilize M available slots, with M less than N (note that for simplicity the forgoing example assumes that time multiplexing is the only type of multiplexing being applied). In this way, STDM can support more devices than synchronous TDM. The number of time slots in an STDM system may be based on a statistical analysis of the number of devices that are likely to be transmitting at any given time. Rather than being preassigned, each slot is available to any of the attached device that has data to send.

In example embodiments described herein, either synchronous TDM, STDM or a combination of both may be utilized. Thus, for example, in some embodiments, one or more devices may be configured to operate over predetermined fixed time slots while other devices may be configured to share any remaining time-slots dynamically (e.g., based on a priority allocation thereof). This may be particularly, advantageous in the context of a hybrid radar/radio communications system, where radar may benefit from fixed time-slot allocation while radio signals may adequately share time-slots dynamically. A scheduling algorithm may dynamically reserve a variable number of time slots in each frame to variable bit-rate data streams, based on the traffic demand of each data stream. For example, STDM may be applied to Tactical Data Links (TDL) across a Multi-TDL Network (MTN) for remaining time slot allocation in a hybrid radar/radio communications system.

Turning to frequency-division multiplexing (FDM) (with reference still to FIG. 1) radar signals may typically have frequency diversity capabilities, e.g., where individual radar channels are limited to a particular sub-band. FDM is a technique by which the total bandwidth available in a communication medium is divided into a series of non-overlapping frequency bands (each of which is used to carry a separate signal). In example embodiments, the multiple separate information (modulation) signals that are sent over an FDM system may be called baseband signals. In some embodiments, FDM may be implemented by an electronic oscillator generating a carrier signal (a steady oscillating waveform at a single frequency that serves to "carry" information) for each frequency channel. The carrier signal may be much higher in frequency than the baseband signal. The carrier signal and the baseband signal may be combined in a modulator circuit to alter some aspect of the carrier signal, such as its amplitude, frequency, or phase, with the baseband signal, "piggybacking" the data onto the carrier. The result of modulating (mixing) the carrier with the baseband signal is to generate sub-frequencies near the carrier frequency (at the sum ($f_C+f_B$) and difference ($f_C-f_B$) of the frequencies). The information from the modulated signal may be carried in one or both of the sidebands of the carrier frequency. Therefore, all the information carried by the channel may be clustered in a narrow band of frequencies around the carrier frequency (called the passband of the channel). Additional baseband signals may be used to modulate carriers at other frequencies, creating other channels of information. The carriers may be spaced far enough apart in frequency that the band of frequencies occupied by each channel, the passbands of the separate channels, do not overlap. As long as the channel frequencies are spaced far enough apart that none of the passbands overlap, the separate channels will not interfere with each other when transmitted simultaneously over the transmission medium. Thus the available bandwidth may effectively be divided into "slots" or channels, each of which can carry a separate modulated signal. As noted above, in some embodiments, a radar signal may serve as a master or dominant signal (completely utilizing one or more sub-bands). Thus, in example embodiments, there is an opportunity to make use of open channels frequency sub-bands between radar channels to allocate bandwidth to radio signals.

In some embodiments, OFDM (orthogonal frequency division multiplexing) may be utilized for bandwidth allocation. Orthogonal frequency-division multiplexing (OFDM) is one example technique of encoding digital data on multiple carrier frequencies. OFDM is a frequency-division multiplexing (FDM) scheme used as a digital multi-carrier modulation method. A large number of closely spaced orthogonal sub-carrier signals are used to carry data on several parallel data streams or channels. Each sub-carrier is modulated with a conventional modulation scheme (such as quadrature amplitude modulation or phase-shift keying) at a low symbol rate, maintaining total data rates similar to conventional single-carrier modulation schemes in the same allocation band. One advantage of OFDM is its ability to cope with severe channel conditions (for example, attenuation of high frequencies). Conceptually, OFDM is a specialized FDM, the additional constraint being that all carrier signals are orthogonal to one another. In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional FDM, a separate filter for each sub-channel may be avoided. The orthogonality also allows high spectral efficiency, with a total symbol rate near the Nyquist rate for the equivalent baseband signal (i.e. near half the Nyquist rate for the double-side band physical passband signal). Almost the whole available frequency band can be utilized. OFDM generally has a nearly 'white' spectrum, giving it benign electromagnetic interference properties with respect to other co-channel users. The orthogonality allows for efficient modulator and demodulator implementation using the FFT algorithm on the receiver side, and inverse FFT on the sender side. OFDM is popular for wideband communications today by way of low-cost digital signal processing components that can efficiently calculate the FFT.

Notably, OFDM may require accurate frequency synchronization between the receiver and the transmitter; with frequency deviation the sub-carriers will no longer be orthogonal, causing inter-carrier interference (ICI) (i.e., cross-talk between the sub-carriers). More particularly, frequency error in OFDM systems is often called carrier frequency offset (CFO). CFO can be caused by frequency differences between the transmitter and receiver oscillators, Doppler shift of mobile channels, or oscillator instabilities. CFO may be classified into two categories: fractional sub-carrier spacing CFO, and integer sub-carrier spacing CFO. Fractional CFO introduces inter-carrier interference (ICI) between sub-carriers. It destroys the orthogonality of sub-carriers and results in bit error rate (BER) degradation. Integer CFO does not introduce ICI between sub-carriers, but does introduce a cyclic shift of data sub-carriers and a phase change proportional to OFDM symbol number. There are several techniques to estimate and compensate for these errors using time-domain or frequency-domain approaches, sometimes called pre-FFT and post-FFT synchronization, respectively.

Pre-FFT synchronization performs the estimation of CFO before OFDM demodulation (FFT processing). The pre-FFT approach provides fast synchronization and requires less computing power due to the fact that no FFT processing is needed. Pre-FFT synchronization can be classified into two categories: non-data-aided (NDA) and data-aided (DA). NDA techniques exploit similarities between a cyclic prefix (CP) part and the corresponding data part of a received OFDM symbol to estimate fractional CFO. This can be done by correlating the CP and the corresponding OFDM symbol to estimate both timing and frequency offsets. These methods require no additional OFDM training symbols, improving transmission efficiency. If the CP is heavily disturbed by severe multipath fading, part or all of the cyclic prefix of a given symbol will be interfered with by the previous symbol. As a result, the estimation accuracy is significantly degraded, causing degradation of performance. In order to increase the frequency error estimation accuracy and compensate for the impact of multipath fading, NDA frequency synchronization requires a fine timing synchronization technique. DA techniques exploit a known sequence of OFDM training symbols inserted at the start of every OFDM packet to estimate fractional CFO. The downside of DA pre-FFT synchronization is reduced transmission efficiency due to the insertion of the training symbols. However, this technique provides better results and a wider CFO estimation range than the NDA algorithms.

Post-FFT synchronization methods usually perform the estimation of the remaining integer CFO left by pre-FFT frequency synchronization. Integer CFO can be estimated by correlating received pilot sub-carriers with a shifted version of the known pilot sub-carriers. Depending on spacing between pilot sub-carriers, this approach can estimate CFO range up to several multiple integers of sub-carrier spacing. Using the pilot sub-carrier approach, one can also estimate sampling clock frequency offset by using a special pilot sub-carrier pattern. This integer CFO synchronization technique may be effectively performed after coarse timing synchronization and coarse frequency synchronization have been established (acquisition stage) to track the residual CFO errors, common phase error (CPE) left by pre-FFT frequency synchronization, and receiver local oscillator phase noise, respectively.

One key principle of OFDM is that since low symbol rate modulation schemes (i.e., where the symbols are relatively long compared to the channel time characteristics) suffer less from intersymbol interference caused by multipath propagation, it is advantageous to transmit a number of low-rate streams in parallel instead of a single high-rate stream. Since the duration of each symbol is long, it is feasible to insert a guard interval between the OFDM symbols, thus eliminating the intersymbol interference. The guard interval also eliminates the need for a pulse-shaping filter, and it reduces the sensitivity to time synchronization problems. A cyclic prefix, which is transmitted during the guard interval, may consist of the end of the OFDM symbol copied into the guard interval (where the guard interval is transmitted followed by the OFDM symbol). The reason that the guard interval consists of a copy of the end of the OFDM symbol is so that the receiver will integrate over an integer number of sinusoid cycles for each of the multipaths when it performs OFDM demodulation with the FFT. In some standards, in the interest of transmitted power, the cyclic prefix may be skipped (with nothing being sent during the guard interval). In such embodiments, the receiver may then mimic the cyclic prefix functionality by copying the end part of the OFDM symbol and adding it to the beginning portion).

Effects of frequency-selective channel conditions, for example fading caused by multipath propagation, can be considered as constant (flat) over an OFDM sub-channel if the sub-channel is sufficiently narrow-banded (i.e., if the number of sub-channels is sufficiently large). This makes frequency domain equalization possible at the receiver, which is simpler than the time-domain equalization used in conventional single-carrier modulation. In OFDM, the equalizer may advantageously multiply each detected sub-carrier (each Fourier coefficient) in each OFDM symbol by a constant complex number, or a rarely changed value.

Notably, OFDM may be advantageously used in conjunction with channel coding. Furthermore OFDM may use frequency and/or time interleaving. By using frequency interleaving (rather than using frequency selective channels) loss in a single channel is mitigated since each signal is spread across multiple channels. Thus, an example scheme may be to interleave radio signals in the open bandwidth spaces left by the radar frequency diversity allocation. One reason why interleaving is used on OFDM is to spread errors out in the bit-stream. A classical type of error correction coding used with OFDM-based systems is convolutional coding, often concatenated with Reed-Solomon coding. The choice for Reed-Solomon coding as the outer error correction code is based on the observation that the Viterbi decoder used for inner convolutional decoding produces short error bursts when there is a high concentration of errors, and Reed-Solomon codes are inherently well-suited to correcting bursts of errors. Near-optimal types of error correction codes that use the turbo decoding principle (where the decoder iterates towards the desired solution) may also be implemented. Examples of such error correction coding types include turbo codes and LDPC codes, which perform close to the Shannon limit for the Additive White Gaussian Noise (AWGN) channel. Some systems may concatenate turbo/LDPC coding with Reed-Solomon and/or Bose-Chaudhuri-Hocquenghem (BCH) codes to improve upon an error floor inherent to these codes at high signal-to-noise ratios.

Adaptive transmission may also be applied, e.g., based on an analysis of power allocation across all sub-carries or within a given sub-carrier. Notably, power allocation may be informed by needed signal strength. Thus, an adaptive system may also account for allocating stronger signal bandwidth to priority radio signals or radio signals with a greater need (e.g., based on transmission distance and signal to noise constraints). Thus, in some embodiments, resilience to severe channel conditions can be further enhanced if information about the channel is sent over a return-channel. Based on this feedback information, adaptive modulation, channel coding and power allocation may be applied across all sub-carriers, or individually to each sub-carrier. For individual sub-carriers, if a particular range of frequencies suffers from interference or attenuation, the carriers within that range can be disabled or made to run slower by applying more robust modulation or error coding to those sub-carriers.

Referring still to FIG. 1, a further dimensionality for allocating resources across a communications network is spatial multiplexing. In the case of radar signals typically beam pattern partitioning may be utilized to establish a spatial waveform signature for the radar signal. In a simple example, orthogonality may be used to spatially distinguish between two waveforms. Thus, in some embodiments, a system may be configured to enable use of one of two orthogonal waveforms within each sub-band to a particular communications user. Notably, other spatial qualifiers may also be used. For example in the context of a radio communication, one example of a waveform pattern would be a horn beam pattern.

In wireless communication, space-division multiplexing may be achieved with multiple antenna elements forming a phased array antenna. Example antenna configurations include multiple-input and multiple-output (MIMO), single-input and multiple-output (SIMO) and multiple-input and single-output (MISO) multiplexing. Different antenna designs provide different multi-path propagation (echo) signatures, making it possible for digital signal processing techniques to separate different signals from each other. These techniques may also be utilized for space diversity (improved robustness to fading) or beamforming (improved selectivity) rather than multiplexing.

Beamforming or spatial filtering is one signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. Compared with omnidirectional reception/transmission this may be known as the directivity of an array. To change the directionality of the array when transmitting, a beamformer may control the phase and relative amplitude of the signal at each transmitter, in order to create a pattern of constructive and destructive interference in the wavefront. When receiving, information from different sensors is combined in a way where the expected pattern of radiation is preferentially observed.

In passive sonar, and in reception in active sonar, beamforming techniques may involve combining delayed signals from each hydrophone at slightly different times (the hydrophone closest to the target will be combined after the longest delay), so that every signal reaches the output at exactly the same time, making one loud signal, as if the signal came from a single, very sensitive hydrophone. Receive beamforming can also be used with microphones or radar antennas. With narrow-band systems the time delay is equivalent to a "phase shift", so in this case the array of antennas, each one shifted a slightly different amount, is called a phased array. A narrow band system, typical of radars, is one where the bandwidth is only a small fraction of the center frequency. With wide band systems this approximation no longer holds, which is typical in sonars.

In some embodiments, in the receive beamformer the signal from each antenna may be amplified by a different "weight." Different weighting patterns (e.g., Dolph-Chebyshev) can be used to achieve the desired antenna sensitivity patterns. A main lobe is produced together with nulls and sidelobes. As well as controlling the main lobe width (the beam) and the sidelobe levels, the position of a null can be controlled. A similar result can be obtained on transmission. Some antenna beamformers use a fixed set of weightings and time-delays (or phasings) to combine the signals from the sensors in the array, primarily using only information about the location of the sensors in space and the wave directions of interest. In contrast, adaptive beamforming techniques may combine this information with properties of the signals actually received by the array, typically to improve rejection of unwanted signals from other directions. This process may be carried out in either the time, frequency, spatial domains.

Multiple-input and multiple-output (MIMO) is one technique for multiplying the capacity of a radio link using multiple transmit and receive antennas to exploit multipath propagation. Precoding may be used in multi-stream beamforming. In point-to-point systems, precoding means that multiple data streams are emitted from the transmit antennas with independent and appropriate weightings such that the link throughput is maximized at the receiver output. Spatial multiplexing may be applied utilizing MIMO antenna configuration. In such spatial multiplexing, a high-rate signal is split into multiple lower-rate streams and each stream is transmitted from a different transmit antenna in the same frequency channel. If these signals arrive at the receiver antenna array with sufficiently different spatial signatures and the receiver has accurate channel state information (CSI), it can separate these streams into (almost) parallel channels. Spatial multiplexing is a very powerful technique for increasing channel capacity at higher signal-to-noise ratios (SNR). The maximum number of spatial streams is may be limited by the number of antennas at the transmitter or receiver. Spatial multiplexing can be used without CSI at the transmitter, but can be combined with precoding if CSI is available. Spatial multiplexing can also be used for simultaneous transmission to multiple receivers, known as space-division multiple access or multi-user MIMO. The scheduling of receivers with different spatial signatures allows good separability.

Referring again to FIG. 1, a fourth possible dimensionality is waveform coding (e.g., digital signal coding) also known as code division multiplexing (CDM). In particular a coded pattern may be applied to a transmitted signal as a unique type of identifier for that signal. Example, coding's could include pseudorandom binary coding for radar signals or DSSS coding for radio signals. Notably, coding may be more time consuming that some of the other modalities of distinguishing between waveforms. Thus in some embodiments, coding may be used for validation rather than a primary means for distinguishing between waveforms.

Code division multiplexing (CDM)(including Code division multiple access (CDMA) or spread spectrum) is a class of techniques where several channels simultaneously share the same frequency spectrum, and this spectral bandwidth may be much higher than the bit rate or symbol rate. One form is frequency hopping, another is direct sequence spread spectrum. In the latter case, each channel transmits its bits as a coded channel-specific sequence of pulses called chips. Number of chips per bit, or chips per symbol, is the spreading factor. This coded transmission typically is accomplished by transmitting a unique time-dependent series of short pulses, which are placed within chip times within the larger bit time. All channels, each with a different code, can be transmitted on the same medium, and asynchronously de-multiplexed. Advantages are that variable bandwidth is possible (just as in statistical multiplexing), that the wider bandwidth allows for more flexibility regarding signal-to-noise ratio.

CDMA is an example of multiple access technique, wherein several transmitters can send information simultaneously over a single communication channel to multiple receivers. This allows several users to share a band of frequencies (see bandwidth). To permit this without undue interference between the users, CDMA employs spread spectrum technology and a special coding scheme (where each transmitter is assigned a code). Each user in a CDMA system uses a different code to modulate their signal. Choosing the codes used to modulate the signal may be important in the performance of CDMA systems. The best performance occurs when there is good separation between the signal of a desired user and the signals of other users. The separation of the signals may be made by correlating the received signal with the locally generated code of the desired user. If the signal matches the desired user's code, then the correlation function will be high and the system can extract that signal. Cross-correlation should be as close to zero as possible. Furthermore, if the code is correlated with the signal at any time offset other than zero, the correlation should be as close to zero as possible. This is referred to as auto-correlation and is used to reject multi-path interference.

In general, CDM belongs to two basic categories: synchronous (orthogonal codes) and asynchronous (pseudorandom codes). Synchronous CDM exploits mathematical properties of orthogonality between vectors representing data strings. For example, binary string 0110 is represented by the vector (0, 1, 1, 0). Vectors can be multiplied by taking their dot product, by summing the products of their respective components. If the dot product is zero, the two vectors are said to be orthogonal to each other. Each user in synchronous CDM uses a code orthogonal to the others' codes to modulate their signal. Orthogonal codes have a cross-correlation equal to zero; in other words, they do not interfere with each other. When links cannot be precisely pre-coordinated (particularly due to the mobility of devices entering and leaving a particular geographic region) a different approach may be utilized. Since it is not mathematically possible to create signature sequences that are both orthogonal for arbitrarily random starting points and which make full use of the code space, unique "pseudo-random" or "pseudo-noise" (PN) sequences may be used in asynchronous CDM systems. A PN code is a binary sequence that appears random but can be reproduced in a deterministic manner by intended receivers. These PN codes may be used to encode and decode a user's signal in asynchronous CDM in the same manner as the orthogonal codes in synchronous CDM (shown in the example above). These PN sequences are statistically uncorrelated, and the sum of a large number of PN sequences results in multiple access interference (MAI) that is approximated by a Gaussian noise process (following the central limit theorem in statistics). If all of the users are received with the same power level, then the variance (e.g., the noise power) of the MAI increases in direct proportion to the number of users. In other words, unlike synchronous CDM, the signals of other users will appear as noise to the signal of interest and interfere slightly with the desired signal in proportion to number of users.

Similar to embodiments noted above with respect to TDM, either synchronous CDM, asynchronous CDM or a combination of both may be utilized. Thus, for example, in some embodiments, one or more devices may be configured to operate over predetermined fixed coding with full orthogonality, while other devices may be configured to utilize "pseudo-random" or "pseudo-noise" (PN) sequences from the remaining codespace. This may be particularly advantageous where permanent or high priority communication devices may benefit from predetermined orthogonal coding while other radio signals entering and leaving a geographic region may adequately share the remaining codespace dynamically.

Each of the forgoing multiplexing techniques (TDM, FDM and CDM) may be further extended into a multiple access method or channel access method, for example, TDM into time-division multiple access (TDMA) and statistical multiplexing into carrier-sense multiple access (CSMA). A multiple access method makes it possible for several transmitters connected to the same physical medium to share its capacity. Multiplexing may be provided by the Physical Layer of the OSI model, while multiple access may also involves a media access control protocol, which is part of the Data Link Layer. The Transport layer in the OSI model, as well as TCP/IP model, may provide for statistical multiplexing of several application layer data flows to/from the same computer.

In theory, TDM, FDM and CDM have similar spectral efficiency, but, in practice, each has its own challenges, e.g., timing in the case of TDM, frequency generation/filtering in the case of FDM and power control in the case of CDM. As noted herein, TDM typically may synchronize the transmission times of all the users to ensure that they are received in the correct time slot and do not cause interference. Since this often cannot be perfectly controlled in a mobile environment, each time slot may include a guard time, which reduces the probability that users will interfere, but decreases the spectral efficiency thereof. Similarly, FDMA systems may use a guard band between adjacent channels, due to the unpredictable Doppler shift of the signal spectrum because of user mobility. The guard bands will reduce the probability that adjacent channels will interfere, but decrease the utilization of the spectrum. In predesigning a hybrid radio/radar communications system, it may be advantageous to utilize optimal combinations of TDM, FDM and CDM in conjunction with spatial multiplexing (e.g., orthogonality) to best suit disparate requirements of radar and radio devices (e.g., with respect to spectral efficiency).

Referring still to FIG. 1, cardinality may also be utilized in optimizing multiplexing. it should be appreciated that a given communications network may cover a plurality of communicating groups each of which may include a combination of radar and radio signals. Indeed, in some embodiments, the systems and methods described herein may provide for communication networks that are configured to manage any and all communications across all deployed communications devices in a particular geographic region and/or across multiple geographic regions. It should be appreciated that individual communication devices may often times move between geographic regions and join/leave various groups. Thus, the systems and methods provided herein may advantageously be adaptive to changes in cardinality of communication devices within a region. Thus, each distinct geographic region/deployment scenario may include its own cardinality with respect to signal multiplexing therein. As a communications device enters or leaves a particular geographic region/deployment scenario the communications device may modify its protocol to communicate in each new setting. At any given point in time all communication signals under a particular cardinality may then be multiplexed as described herein using other dimensionalities such as time, frequency, spatial and code multiplexing. Notably, in the context of an overall communications network cardinalities may be modeled as a complex multi-node network (e.g., where each node may be assigned a particular cardinality, e.g., based on geographic groupings thereof). It may further be advantageous to ensure that communications signals sharing a common communications signature are spread out geographically. Thus, assignment of communications signatures within a particular cardinality may account for signatures of communication signals in neighboring cardinalities. In a more general embodiments, the systems and method of the present disclosure may advantageously utilize a multi-node network model to actively monitor potential conflicts between communications signals across the network and reassign a different unique signature to one of those signals if a conflict/overlap is detected. This may be implemented by establishing a geographic based cardinality for each communication signal identifying a plurality of other communication devices which are close enough geographically or have the signal strength to potentially impact the communication signal. Then, in determining a multi-dimensional signature for the communication device, the system may be configured to automatically avoid any signature which overlaps/interferes with a signature of one of the other communications devices in that cardinality. As described cardinality groupings may be device specific (e.g., each device may actively define its own cardinality) or based on other factors such as geographic/deployment groupings.

Figure 2:
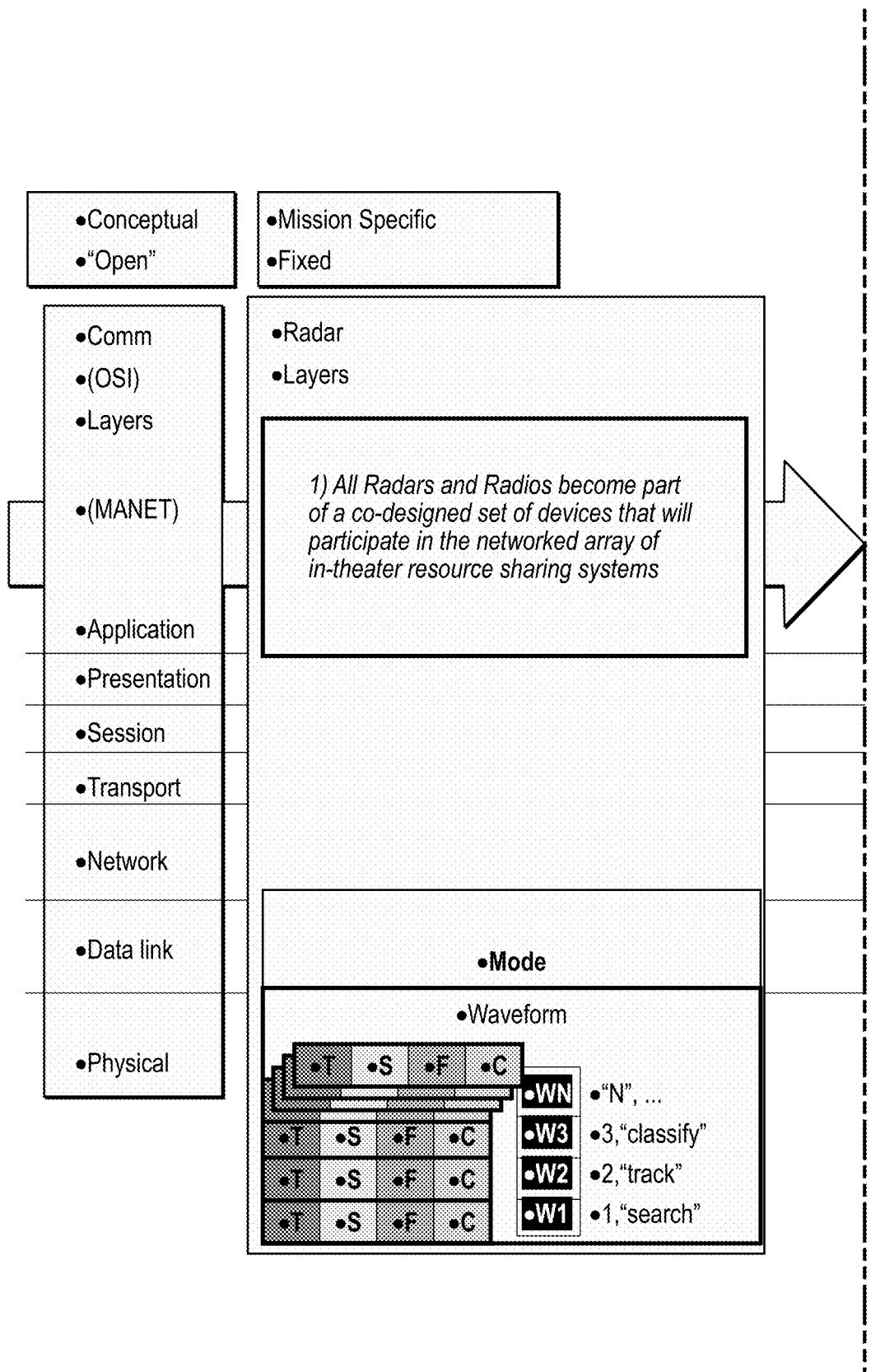
FIG. 2 depicts an example flow chart for implementing multiplexing in a hybrid radar/radio communications system, according to the present disclosure.
Figure 2:
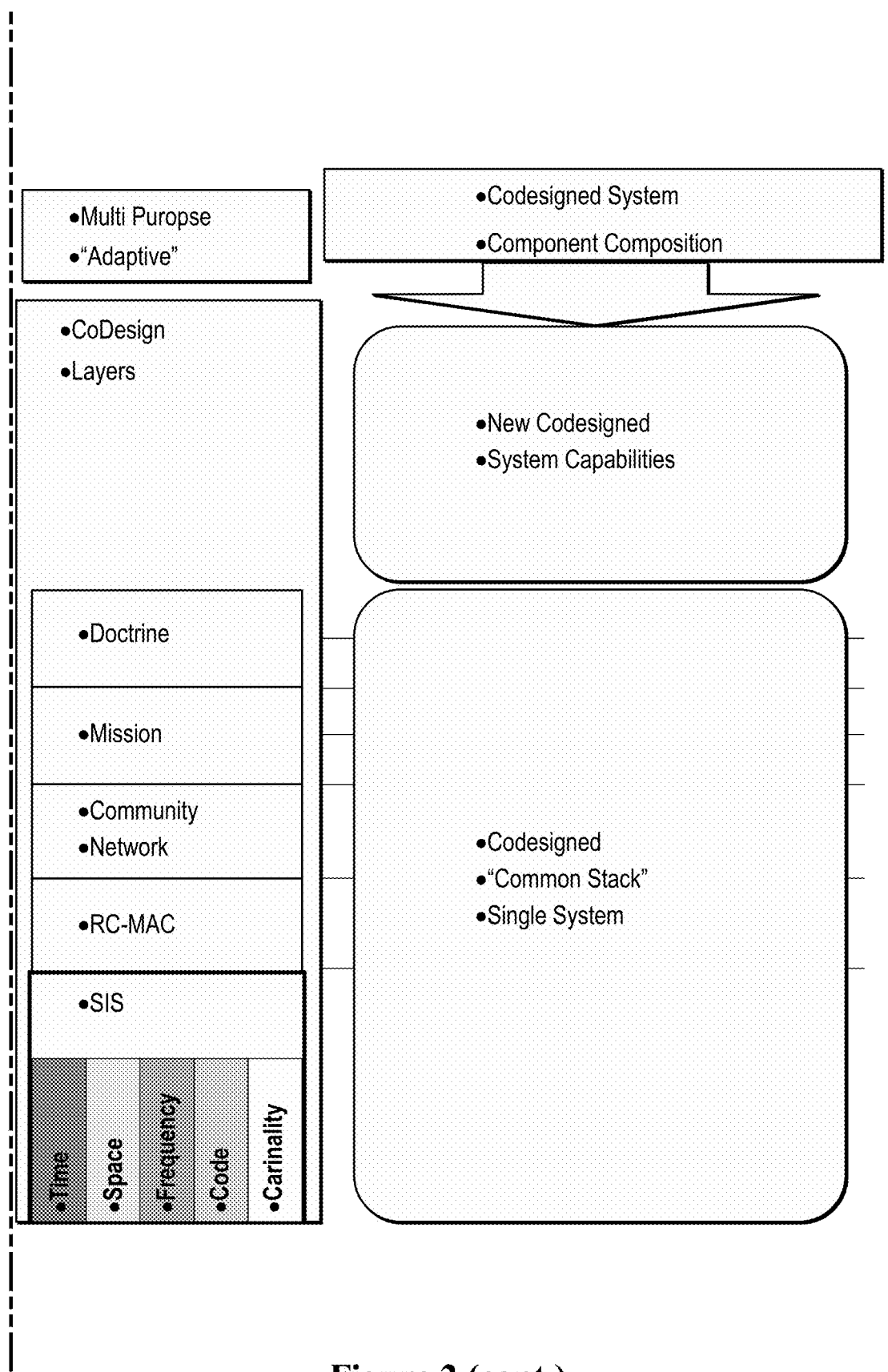

With reference to FIG. 2, an example flow chart for implementing multiplexing in a hybrid radar/radio communications system is provided. In particular, the OSI model may be applied. Mission specific parameters may be also be considered in the optimization problem and solution. This may include considering fixed design parameters for radar (and possibly radio communications) devices for a specific deployment scenario. These fixed design parameters may be implemented in the OSI model. Furthermore, multipurpose or adaptive parameters may also be considered. These may include doctrine, mission, community type parameters which factor into the co-design of radar/radio communications systems. For example, factors which may be considered include priority allocation for different devices, fixed allocation vs. dynamic allocation for different devices, cardinality of devices and whether such cardinality is dynamic or fixed, access and join protocol for new devices, etc. A hybrid radar/radio communications MAC (RC-MAC) may be implemented via OSI based on the multipurpose adaptive parameters. This may advantageously be implemented as a common stack, single system implementation.

Figure 3:
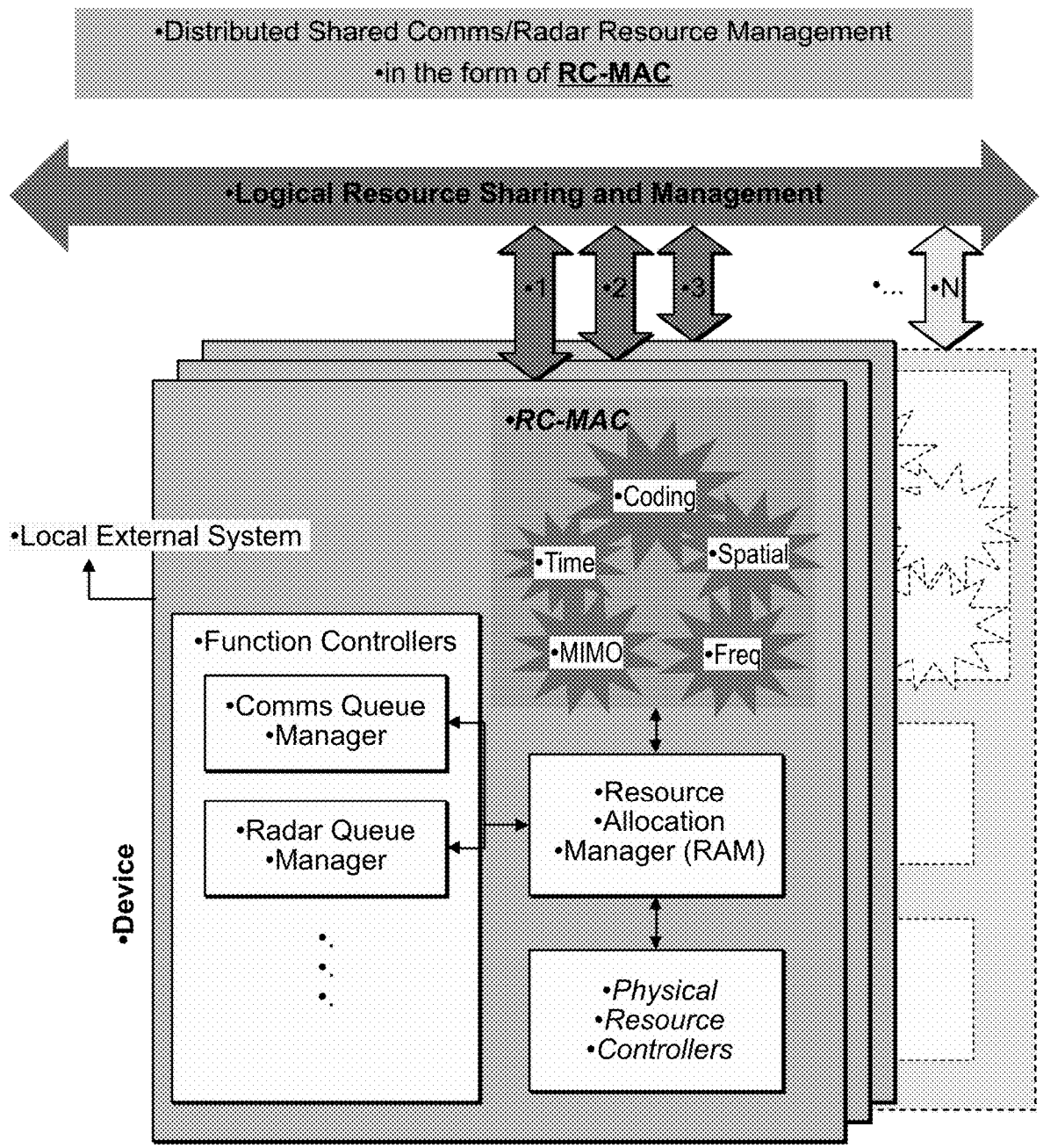
FIG. 3 depicts an exemplary distributed resource management protocol for a hybrid radar/radio communications system, according to the present disclosure.

FIG. 3 depicts an exemplary distributed resource management protocol for a hybrid radar/radio communications system. As described above, each may include a common MAC for both radar and communications (RC-MAC) that manages access to both. This corresponds to the unit-by-unit allocation pre-programmed according to the example of FIG. 2. As also described above, each device may also include a RAM which is also common across devices. The RAM may carry out common resource allocation algorithms that will have at their core common outcomes across all devices so that resource allocations will be known to and among all devices. As noted above, these algorithms may be based on pseudorandom hashing algorithms that award resources to each of the devices ("winners") participating in the network. The RAM may allocate resources based on function controllers which may advantageously include separate queue managers for each of radar and radio communications. Thus, the RAM may allocate resources differently for each of radio and radar communications based on pre-programmed parameters (e.g., for priority).

Figure 4:
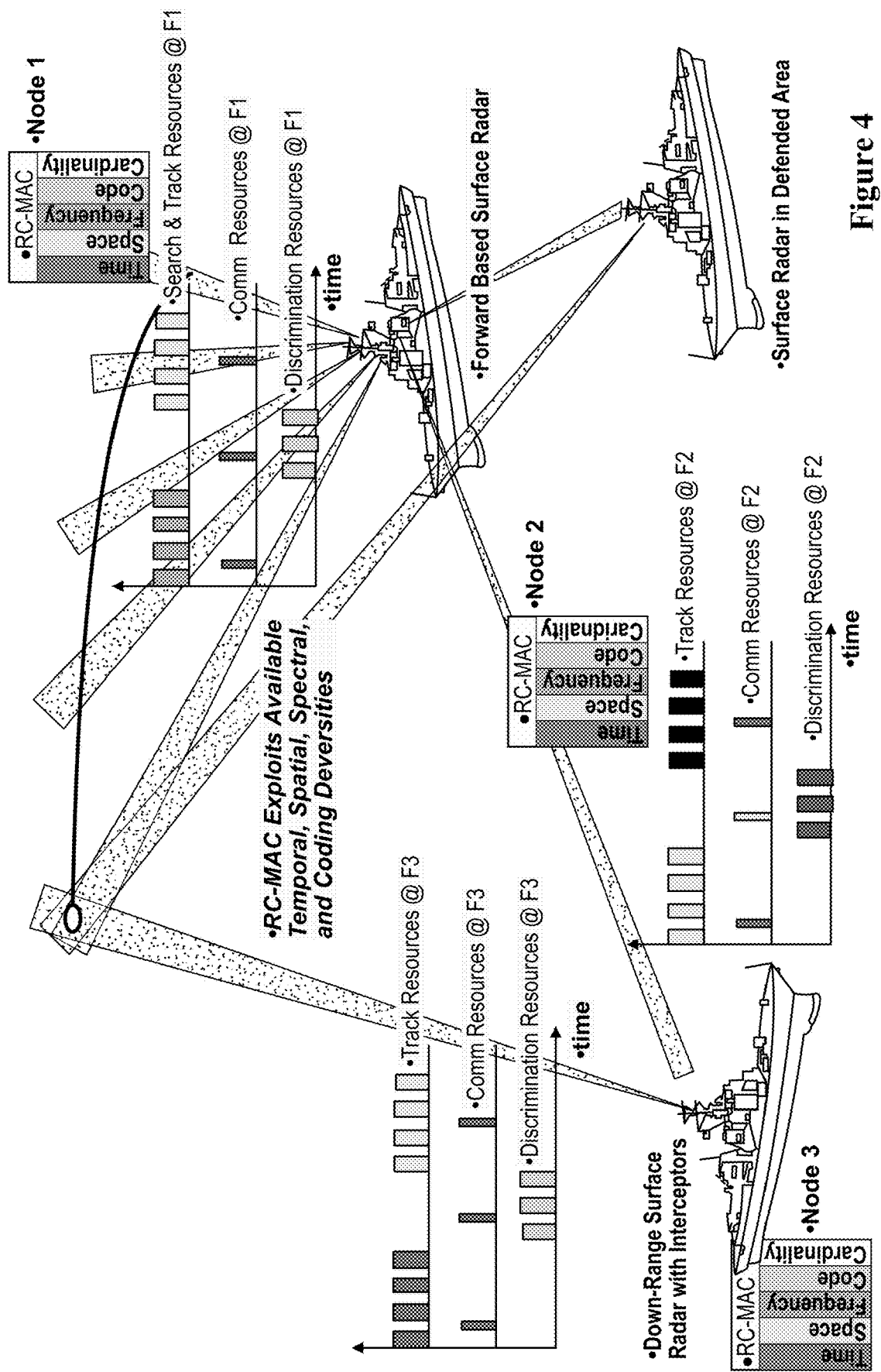
FIG. 4 depicts an exemplary an exemplary allocation of resources according to the embodiment of FIGS. 2 and 3, according to the present disclosure.

FIG. 4 depicts an exemplary an exemplary allocation of resources according to the embodiment of FIGS. 2 and 3. In particular, FIG. 4 depicts a usage pattern of (spatial-spectral-waveform) resource usage so that each of the participants get access to the medium to perform radar functions (search, track, identify) and communications (data, voice) functions without interfering with one another. Notably, the RC-MAC exploits Available Temporal, Spatial, Spectral, and Coding Diversities. This illustrates example design parameters which may be considered in co-designing access protocol for a hybrid radar/radio communications system. The mission specific functions and parameters of each of the devices factor heavily into the allocation protocol. For example, in the embodiment of FIG. 4, the mission specific parameters call for cooperation between a forward-based surface radar, a down-range surface radar and a surface radar in a defended area. Cooperative air search-while-track is dependent on the combat identification (CID) radar modes that interrogate the detected airborne object in an effort to determine distinguishing features of that object. These CID modes generally perform with significant aspect dependencies. Cooperative radar operation of the type envisioned provides the necessary spatial diversity for which the CID modes quickly yield generate a high-confidence declaration of the object. Having characterized the object, the radar tracking (and "revisits") can be correctly managed. Furthermore, data and voice radio communications are to be maintained between all nodes. It is noted the FIG. 4 is only one example embodiment and is not intended to be limiting to the systems and methods described herein.

Figure 5:
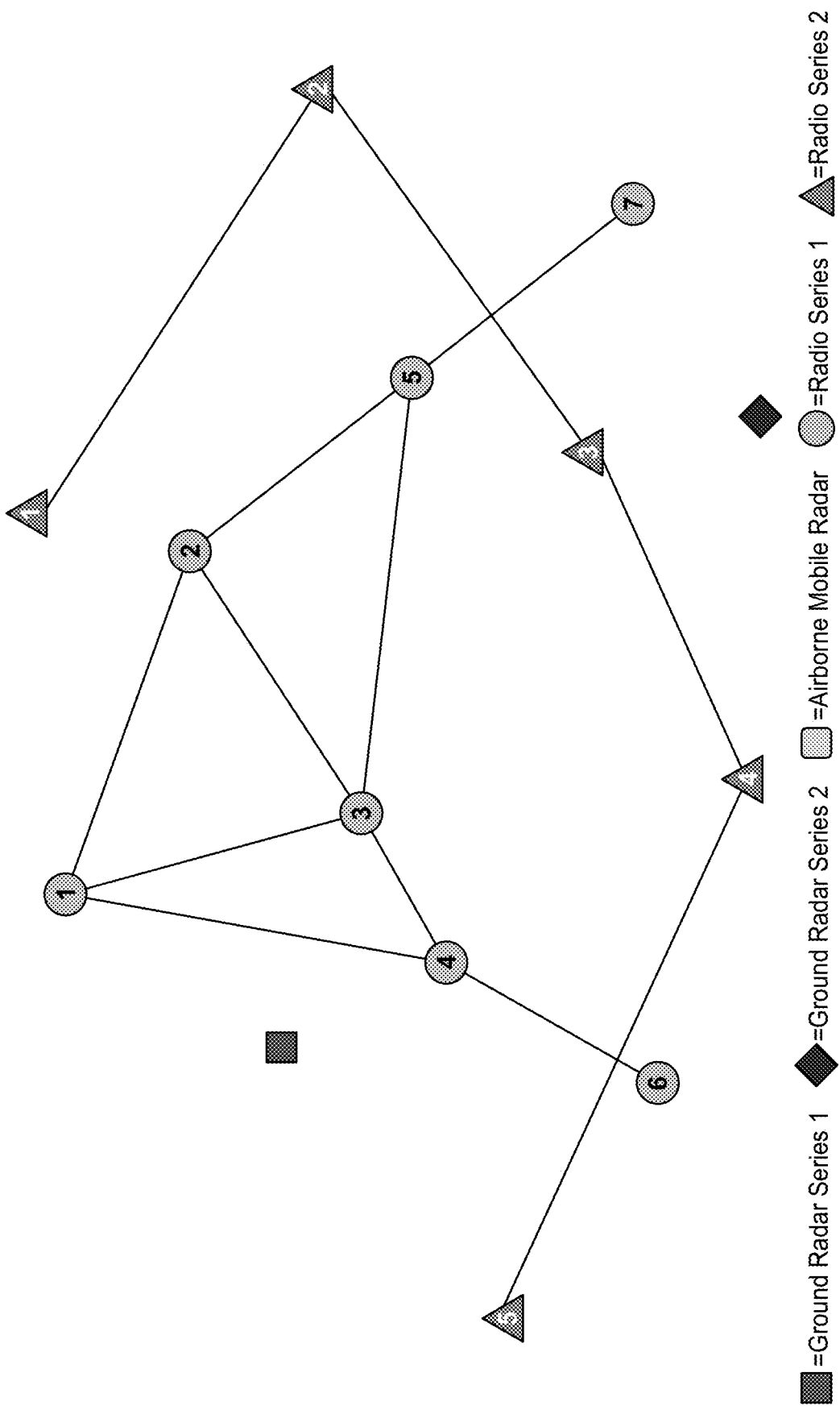
FIG. 5 depicts an exemplary a geometric layout of devices in a communications network for a static world view, according to the present disclosure.
Figure 9:
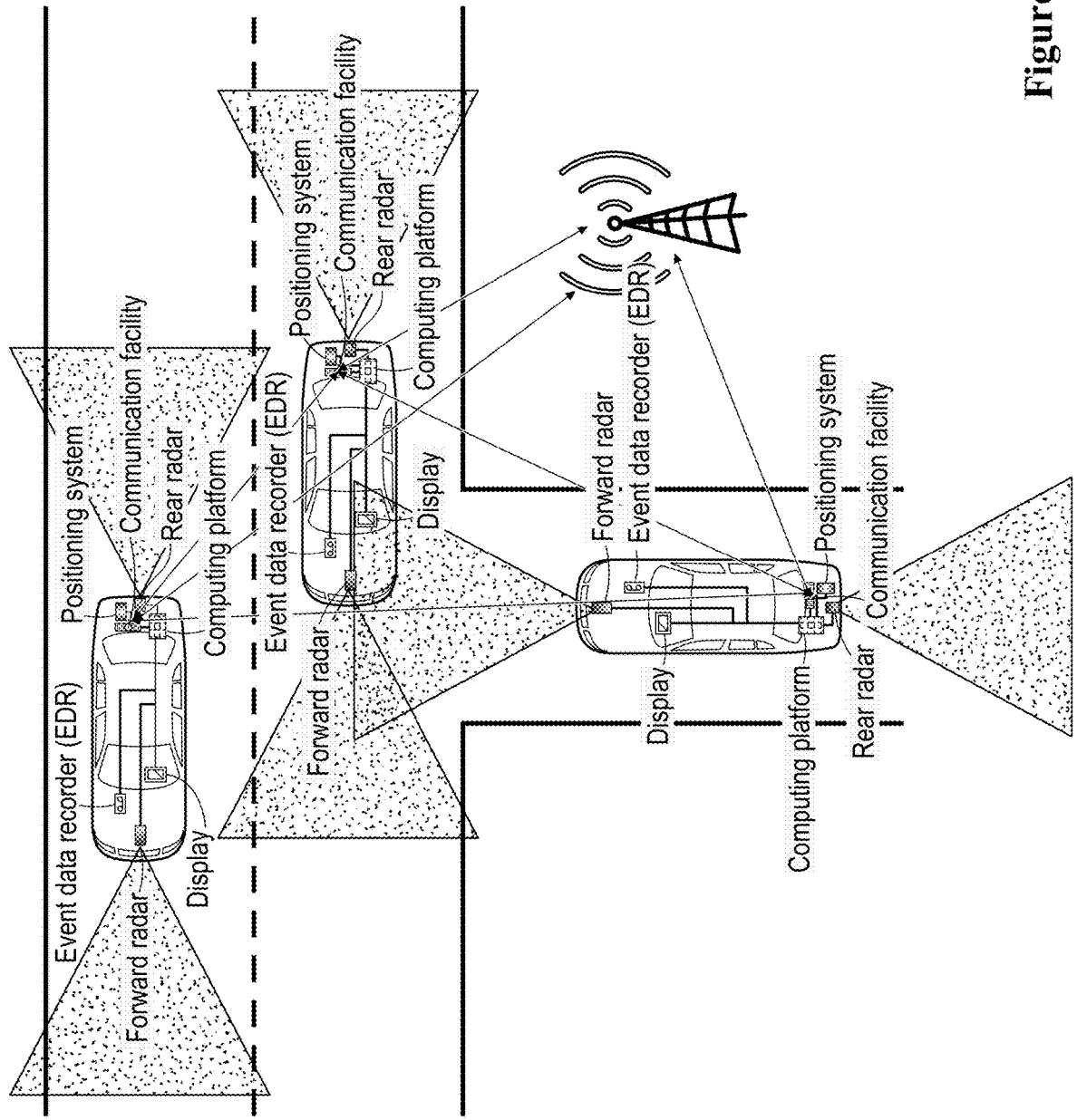
FIG. 9 depicts an example vehicular hybrid communications network, according to the present disclosure.

FIG. 9 presents a further example of a mixed radar radio network that can implement the systems and methods of the present disclosure. In particular, FIG. 5 depicts a vehicular ad hot network (VANET) between three vehicles (V1, V2 and V3) each of which include front and rear radar systems. Communications between vehicles may be implements via direct vehicle-to-vehicle communications (V2V). In further embodiments, communications may also include communications via telecommunications cellular communications networks (e.g., 3G, 4G, 5G, etc.) or satellite communications networks. Vehicular embodiments of the present disclosure may advantageously leverage the collision avoidance/road safety radar systems now commonplace on automobiles. The current single-purpose of these safety radar systems is for crash avoidance/auto-braking. In the extended application, a hybrid communications network may advantageously be co-designed into the automotive radar system, would make use of the orthogonal dimensions to provide (i) simultaneous fully-mobile connectivity between vehicles with conforming systems, or (ii) simultaneous connectivity with interstate road infrastructure vehicle network access points. In these manners, road conditions can be communicated to cars as they travel ("pothole in the right lane at these GPS coordinates") or to authorities for maintenance purposes.

Military platform embodiments may further leverage innovations such as self-protection radar systems now being deployed on military ground vehicles. In example embodiments, self-protection radar systems are used sense incoming mortars/RPGs and to trigger a responsive countermeasure. In the extended application, a hybrid communications network may advantageously be co-designed into the self-protection system. The co-existing network facilitates high-bandwidth communication between vehicles allowing them to combat the mortar/RPG threats as a team. Furthermore, networking may be provided to airborne UAS-based radar/communications systems, thereby increasing the effective range of threat detection to encompass overhead surveillance, and increase of multiple kilometers.

The following sections illustrates further examples of multidimensional multiplexing across a communications network including both radar and radio signals. In particular a complement of equipment are configured to share the Frequency Band/Frequency Allocation of interest. A first provided example, illustrates multiplexing between thirty networking radios each of which can communicate with one another and two air surveillance radars. In the example, the radios may advantageously occupy a variable amount of the total band (in quantized amounts, for this example, in an OFDM manner) composed of 4 sub-bands depending on how much spectrum is allocated to the radios at a given time, use one of two orthogonal waveforms within each sub-band as well as apply any of 3 orthogonal coding schemes to be decoded by the corresponding communicants (one of which is "no coding"). The radars on the other hand may occupy the full band with one waveform type or occupy one half of the band each. The radars are also uncoded (e.g., null coding). This example is consistent with the idea that typically radar signals may have less flexibility in terms of multiplexing than radio signals. Moreover, in some embodiments, radar signals may serve as master/priority signals and may therefore be given deference to existing signatures within the constructs of the network.

In some embodiments, it may be assumed that communications devices in the system have been co-designed so that this sharing structure can used by all elements (participants) at the time they are deployed. It may also be assumed in some embodiments, that a geographic arrangement and signal capabilities of the participating devices are not known prior to their deployment and that this information is exchanged upon deployment.

The systems and methods described herein advantageously may be configured to provide design guidelines and agreement on the basis of the sharing transactions. For example the system and methods may define:
- timing/slotting that elements may use when in a sharing group;
- frequency utilization (and/or basis functions) possibilities among elements; and
- utilization and terms of sharing/utilization other dimensions Moreover, the systems and methods described herein may also advantageously be configured to provide on-the-fly sharing/allocation/assignment of resources on the basis on the terms of the design. For example:
- the elements may share their capabilities, resource utilization, location and participation in the sharing group at the time of use; and
- the systems and methods may enable moment by moment allocation and usage mapping for each of the participants as described herein.

Provided that each of the communications devices utilizes the same general framework for collaboration and synchronization, they should be able to independently operate in a pseudo-random manner without interference.

Notably, in some embodiments, collaboration data shared between participants may establish the complement (cardinality) and topology (with appropriate and timely updating) of the participants. This can advantageously provide a basis, e.g., for time slot allocation and/or for optimal multiplexing of elements, e.g., so as to minimize cross-talk/interference.

To simplify however, for the example discussed below, we can assume that all elements occupy one geographic dimension and that when a radar "wins" the right to operate (transmit and receive its radar pulse), it occupies 10 consecutive time slots for that operation for every 1 communication time slot. (Rough time scaling between the radar operations and communication operations). In this example, time multiplexing over the radar would include only the 1 open communication time slot in 10.

Thus, based on the above assumptions one can establish the following dimensionality framework (which was briefly described above as well):

For the radios:
  the dimensionality of variation is 4 (frequency sub-bands)×2 (orthogonal waveforms)×3 (codings)
  When operating, the radios can use 1, 2, 3, or 4 sub-bands, 1 of the 2 waveforms and 1 of 3 coding schemes For the radars:
  the dimensionality of variation is 2 (frequency sub-bands)×2 (orthogonal waveforms)×1 (coding)
  When operating, the radars can use one or the other half band, or the entire, 1 of the 2 waveforms and only 1 of the coding schemes Resource allocation within a time slot determines which resource gets first priority to the time slot and allocates according to the needs of the radar or radio element that "wins" the time slot. In our example, allocating resources to a radio is equivalent to assigning the utilization of the resource of the following form:

| Frequency sub-band | | Waveform | Coding |
|---|---|---|---|
| x | x | x | x |

Whereas allocating resources to a radar is equivalent to assigning the utilization of the resource of the following form (unmarked cell is uncoded option):

| Frequency sub-band | | Waveform | Coding |
|---|---|---|---|
| x | | x | x |

Resource allocation for the group of elements may therefore be a matter of a coordinated (every participant having the same Resource Allocation algorithm) sequence of allocation.

As a first example of a sequence of allocation which may be applied within a time slot, consider a resources awarding sequence in which only radios are awarded resources:

Radio 2

| Frequency sub-band | | Waveform | Coding |
|---|---|---|---|
| x | x | x | x |

Radio 5

| Frequency sub-band | Waveform | Coding |
|---|---|---|
| x | x x | x |

Radio 7

| Frequency sub-band | Waveform | Coding |
|---|---|---|
| x x | x x x | x |

Radio 8

| Frequency sub-band | Waveform | Coding |
|---|---|---|
| x x | x | x |

Radio 11

| Frequency sub-band | Waveform | Coding |
|---|---|---|
| x x | x | x |

Radio 14

| Frequency sub-band | Waveform | Coding |
|---|---|---|
| x x | x | x |

Radio 15

| Frequency sub-band | Waveform | Coding |
|---|---|---|
| x x | x | x |

Radio 17

| Frequency sub-band | Waveform | Coding |
|---|---|---|
| x x x | x | x x |

Radio 19

| Frequency sub-band | Waveform | Coding |
|---|---|---|
| x x | x | x |

Radio 22

| Frequency sub-band | Waveform | Coding |
|---|---|---|
| x x | x | x |

Notably, this resource awarding sequence is complicated when priority radar signals are involved. Thus for example a second resource awarding sequence within a timeslot is provided below:

| Frequency sub-band | Waveform | Coding |
|---|---|---|
| Radar 1 | | |
| x | x | x x |
| x x | x | x |
| Radio 1 | | |
| x | x x | x |
| Radio 2 | | |
| x x x | x x | x |
| Radio 6 | | |
| x | x x x | x |
| Radio 8 | | |
| x x | | x x |
| Radio 12 | | |
| x | x x | x x |
| Radio 13 | | |
| x x x | x x | x x |
| Radio 15 | | |
| x x | | x x |
| Radio 16 | | |
| x x | | x x |

Note that the first "resource awarding sequence" for radar operations excludes the radar frequency-waveform-coding combination from use by the radios (in the allocated time slots). Because a radar operation may be 10× the time length of a radio operation, that resource allocation will carry over to the next time slot (for the next 9 if this was the first). The mathematics are a combination of co-design in the front end (e.g., involving determining combination of, and non-interference of, resource utilization prior to deployment or actively, as described herein) and parameterization (e.g., OFDM radio PHY, waveform design, coding design) of waveforms via a structured resource allocation protocol (e.g., such as used in MANET radio networking systems).

In some embodiments, optimal resource allocation may further account for timing requirements for each device (e.g., does the device require real-time communications, what is the acceptable lag between transmit and receipt, etc.). For example, in some embodiments, resource allocation may allocate shared time-slots with radar systems based on priority timing requirements for certain devices. Thus, time-based multiplexing of radio devices may account for the specific timing requirements of each device.

As noted above, in some embodiments hashing algorithms may be provided to award resources to each of the devices ("winners") participating in the network. Also as noted above, these hashing algorithms may include the same types of algorithms used for web based distributed storage and peer to peer systems. As a mathematical algorithm, a distributed hash table allows objects to be hashed or translated into a virtual space which is then able to be partitioned into non overlapping separate allocations for each user of the space. To apportion a multi-dimensional space, multiple hash tables could be used, or the same hash table could be used sequentially. In general, knowledge of the field composition from the world view is input into a common hash algorithm. This common hash algorithm is run by each participant in the field at least once until all resources are exhausted for the time slot. The process is repeated at the next time slot. Notably, allocation may be static or dynamic. In the case of dynamic allocation, a changing world view may redistribute resources (e.g., based on changes in cardinality). FIGS. 5-8 provide examples implementations of resource allocation protocols for static and dynamic world views respectively.

The example protocols govern the distribution of the resources in a modifiably fair way. Thus, they can be altered, e.g., by altering the weights to the way the pseudorandom outcomes pattern the "winning of resources." Advantageously the protocols are implemented by distributed, synchronized algorithms across a plurality of devices. Furthermore, the protocol are usable by sets of static devices or mixed static and dynamic devices, the latter in a quasi-static manner.

For the examples, discussed with respect to FIGS. 5-8 the following assumptions are made. There is a logical communications channel among participants for comparatively slow rate changes (seconds) which allows synchronization to begin. This allows control information to be exchanged including identity (radar, radio, etc.); resource utilization (band occupancy, slot count needs, range of influence, etc.) and position and trajectory information (coordinates, velocity, plan info, etc.). For high rate operation, time is segmented into regular time slots to allocate resources (note that other dimensionalities may be similarly allocated in other examples). For time slot allocation, a common distributed algorithm based on a pseudorandom sequence hashing algorithm exists on all participants (as may be implemented via a RAM).

Design specific parameters are also considered. Thus, in the described example, it is assumed that coding gain is insufficient to allow radios to operate in-band when radars are in operation. Furthermore, all radios transmit and receive omni-directionally in this example. In other embodiments, directional radios may be included increasingly the geometric dimensionality of sharing. Devices can be awarded use of resources but can choose not to use them (radios may not have data to transmit, for example) (this is opposed to on demand type resource allocation). Furthermore, it is assumed that radar range is fairly large (on the order of half the page in the figure) and radio range is considerably smaller (on the order of the radio-to-radio separation).

It should be noted that in some embodiments, design parameters for a given communications system may be predetermined. In some embodiments, a communication system may be configured to dynamically detect existing communication devices and implement a communications network/protocol working within the constraints of such pre-existing fixed parameters. For example, a communications system may detect existing radar communications with fixed constraints and adapt a communications protocol to work around such constraints. Thus, while in preferred embodiments, all devices in a geographic region are included in the resource allocation process, in some embodiments, legacy or non-compliant devices may be excluded from the allocation process with resource allocation working around such pre-existing constraints. Such pre-existing constraints may be dynamically detected upon deployment or predetermined during initial design. In either case the RC-MAC and RAM may account for such pre-existing constraints during resource allocation.

FIGS. 5 and 6 present a static example of a resource allocation protocol. FIG. 5 depicts a geometric layout of the devices in a communications network. In particular, the communications network includes a first group of 6 radios that can intercommunicate, possible links shown with the circle labels; a second group of 5 radios that can intercommunicate, possible links shown with the triangle labels and two ground radars that are far enough apart that they do not interfere but can interfere with their respective nearby radios if not coordinated. A mobile radar is not considered in this static example. For simplicity of this explanation, dimensionalities include only one frequency band, two orthogonal and two coding options available to choose from (to show how contention is resolved).

An exemplary allocation sequence for the static example of FIG. 5 is depicted in FIG. 6. The hashing algorithm is iteratively run to allocate resources for each time slot (until all resources for that time slot are allocated or no further allocation is required). At t1: First run of the algorithm yields radio series group 1 radio 2 (g1r2) win for first control of the media. The sequence of the win and of the radio's characteristics conveys its choice of waveform (orthogonal dimension) and coding option/sequence. Three choices remain. Radio 2 win forces listen mode for group 1 series 1 radios 1, 3 and 5 (denoted 'Sup' for suppressed). Subsequent hash algorithm run awards g2r2 win suppressing g2r1 and g2r3. The orthogonal subspace is chosen and an appropriate waveform is chosen. Subsequent algorithm run creates g2r5 win suppressing g2r4. One coding sequence/orthogonal subspace remains. Radars are excluded because they already interfere with already awarded resources. Only g1r7 can win and does so suppressing g1s6. Next at t2: Hash algorithm yields radar 1 (R1) win. This excludes all devices in the area from the frequency/orthogonality selection and both (all) coding sequences in the region of influence or the radar because of its signal intensity. Subsequent hash algorithm run gives g1r3 win suppressing g1r1, g1r2, g1r4 and g1r5. Only one resource is left which results in a g2r1 win suppressing g1r2. At t3: Radar 1's resource commitment is carried over from t1. Subsequent hash algorithm run awards a win to g1s6 suppressing g1r4 consuming the other orthogonal subspace. A g1r1 win suppresses g1r2 completes the allocations for t2. At t4: Radar 1's resource commitment continues and a g1r6 win utilizes the orthogonal signal subspace while suppressing g1r4. In this case, geographic separation still allows both signal subspaces and codings still available, but a R2 win prevent using the other coding (since coding doesn't allow sufficient signal differentiation). A g2r3 win uses the other signal subspace while suppressing g2r2 and g2r4. At t5: Wins for R1 and R2 are carried over limiting resource options. A girl win suppresses g1r2, g1r3 and g1r4 and a g1 r7 win suppresses g1 r5. The geometric overlap of the two radio groups and ongoing radar resource allocations prevents radio group 2 from any resource usage in t5. At t6: Radar 1 completes its resource allocations in t5 and freeing up resources for reuse but radar 2 continues its resource allocation. A run of the hash algorithm awards resource usage to g2r3 again suppresses g2r2 and g2r4. This utilizes the orthogonal signal subspace. Geometry and resources already consumed also excludes all devices in the region since both signal subspaces are consumed and coding is insufficient. These include g1r2, g1r5, g1r7 and g2r1 and g2r3 as transmitters and its potential receivers because of potential interference. Remaining available resources and devices causes a subsequent hash algorithm run to awards a win to g1r4 then suppressing g1r3 and g1r1. This completes the resource allocation for this t6. At t7: Carry over resource usage for radar 2 continues. Initial Win from the hash algorithm goes to g1r5. Since radar 2 already consumes the one orthogonal subspace in that region. The win also excludes g1r2, g1r3 and g1r7 since they must be able to receive g1r5 transmissions. It also excludes radar 1 since radar 1 from that signal subspace since it can also interfere with g1r2, g1r3 and g1r7, but only that signal subspace. Next run of the hash algorithm yields a win for g2r5 suppressing g2r4. Since either signal subspace or coding can be used, it chooses. Although resources remain that can be used, there is no remaining user that can use a resource that doesn't conflict with an existing element (radar 2 causing a significant consumption issue in the lower right region.

Figure 7:
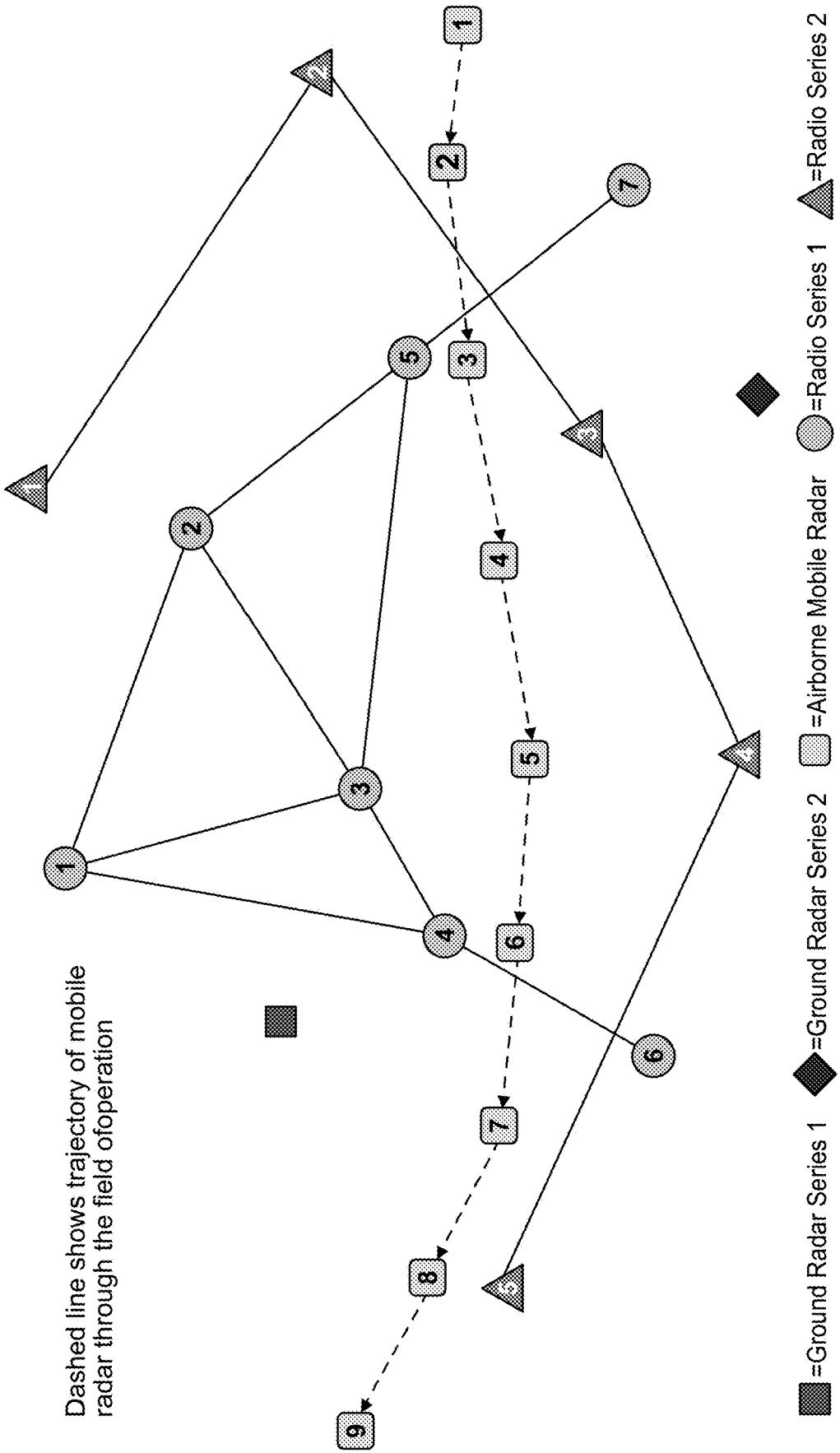
FIG. 7 depicts an exemplary geometric layout of devices in a communications network for a dynamic world view, according to the present disclosure.

FIGS. 7 and 8 present a dynamic example of a resource allocation protocol. For most cases, dynamic allocation may be implemented as a sequence of static allocation cases. In example embodiments, it can be assumed that the protocol is carried out in the dynamic case in each of the positions taken on by the dynamic element. Since there is carry over for devices that require blocks of time slots (a win from a previous time slot requires that a current time slot continues to be owned by the same device), the illustration could convey that a collision could occur as the dynamic device moves to a new geometric domain. However, this is not typically problem if one recognizes that the time scales are generally not that comparable. The time blocks that one device consumes even when it occupies a number of time slots does not represent a large geometric change. This means that the dynamic case can typically be treated as a series of quasi-static cases without loss and very little conflict, if any.

FIG. 7 depicts a geometric layout of the devices in a communications which is similar to the example of FIG. 5 but includes a dashed trajectory showing a dynamic movement of an airborne mobile radar through the field of operation. Although an airborne radar is used in this examples, in other examples, the mobile radar could be on a ground based vehicle, such as an autonomous driving car. FIG. 8 depicts how this dynamic radar could conflict with the resource allocation in the table of FIG. 6. In implementation, a dimension other than geometric diversity may be used to avoid conflict. Note that the mobile radar would not necessarily win each conflict. Rather, FIG. 8 demonstrates the exclusion mechanization of the distributed but coincident algorithm located at each node. In particular, by way of example if it should win it forces dimensional ownership particularly when it overlaps the other two radars. If the dynamic/mobile radar wins when it overlaps only one radar, the other can win, say, the orthogonality dimension and both can coexist without interference. Since the other radar is geometrically displaced, it doesn't interfere. If it wins when it overlaps both radars, only one of the two fixed radars can win the orthogonality resource (since there are only two in this example) and the other cannot use it. Since coding gain is not sufficient, the other radar will be silent when the mobile radar has won the resource. For illustration purposes it is assumed that the mobile radar has the same geometric extent as that of the fixed radars. The diagonally hashed cells in FIG. 8 demonstrate geometric conflict as mobile radar R3 moves through the field. In particular, geometric diversity would not be able to avoid conflict between R3 and R1 and/or R2. However, conflict may be avoided as a quasi-static version of the previous algorithm for each position of R3.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable non-transitory storage medium for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The logic can, for example, be embodied in an FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A communications system for a hybrid communications network designed to support both radar and radio communications devices, the communications system including algorithms implementing a shared source allocation protocol shared by both radio and radar communications devices which, for both radar and radio devices joining the network, automatically allocates communication resources for transmitting and/or receiving a signal based on a dimensions of separability for the signal, the dimensions of separability selected from time-division, frequency-division, spatial-division and/or code-division multiplexing, wherein the resource allocation protocol accounts for both radar specific operational parameters and radio specific operational parameters of the communications network;

wherein the resource allocation protocol is implemented by each device in the network including both radar and radio devices having a common medium access control (MAC); and wherein the resource allocation protocol is further implemented by each the network including both radar and radio devices having a common resource allocation manager (RAM) implementing resource allocation algorithms based on a pseudorandom hashing algorithm that awards communication resources to each device in the network resources based on preprogrammed allocation parameters and a current world view of other devices in the network.

2. The communications system of claim 1, wherein a plurality of dimensions of separability for the signal are used.

3. The communications system of claim 2, wherein the plurality of dimensions of separability include time-division, frequency-division, spatial-division and code-division multiplexing.

4. The communications system of claim 1, wherein the resource allocation protocol are predetermined prior to deployment of the communications network.

5. The communications system of claim 1, further including shared join protocol for both radar and radio devices joining the network whereby a new device joining the network is synchronized to the resource allocation protocol.

6. The communications system of claim 1, wherein the hybrid communications network is a mobile ad hoc network (MANET) or other decentralized type of communications network, wherein the allocation protocol is implemented by distributed, synchronized algorithms across both radar and radio devices.

7. The communications system of claim 1, wherein the hybrid communications network reflects mission specific deployment requirements for a military operation.

8. The communications system of claim 1, wherein each of the radar and radio communications devices in the network is characterized and standardized across the network by a shared Open Systems Interconnection (OSI) model the OSI model implementing the common MAC and RAM.

9. The communications system of claim 1, wherein the current world view of other devices is dynamically updated based on geographic movement between devices in the network.

10. The communications system of claim 1, wherein one or more radar devices are provided with a predetermined fixed resource allocation while one or more radio communications devices are dynamically allocated remaining resources.

11. The communications system of claim 1, wherein time resources are allocated based on statistical time-division multiplexing (STDM).

12. The communications system of claim 1, wherein time resources are allocated based on a combination of synchronous time-division multiplexing (TDM) statistical time-division multiplexing (STDM).

13. The communications system of claim 1, wherein the resource allocation protocol includes algorithms for dividing up available bandwidth into a series of non-overlapping frequency sub-bands, wherein individual radar channels are limited to a particular predetermined sub-band.

14. The communications system of claim 1, wherein the resource allocation protocol includes algorithms for dividing up available bandwidth into a series of non-overlapping frequency sub-bands wherein each sub-band is further divided by orthogonality.

15. The communications system of claim 1, wherein the resource allocation protocols includes algorithms for dividing up available bandwidth into a series of non-overlapping frequency sub-band, wherein adaptive transmission is applied based on an analysis of power allocation across all sub-bands or within a given sub-band, the adaptive transmission allocating stronger signal sub-bands to priority signals.

16. The communications system of claim 1, wherein the resource allocation protocol includes allocating resources based on orthogonal frequency-division multiplexing (OFDM).

17. The communications system of claim 1, wherein the resource allocation protocol further considers cardinality of devices in the communications network.

18. The communications system of claim 1, wherein the resource allocation protocol is configured to allocate communications resources to the device based on a cardinality of the device as relating to a geographic location of the device in relations to a related group of devices across the network.

19. The communications system of claim 1, wherein the resource allocation protocol is configured to utilize a multi-node network model to actively monitor potential conflicts between devices across the communications network and reassign resources if a conflict/overlap is detected.

20. The communications system of claim 19, wherein the resource allocation protocol is configured to establish a geographic based cardinality for each device including both radar and radio devices, wherein the cardinality identifies other devices which are close enough geographically or have the signal strength to potentially conflict with the device signal.

* * * * *